(12) United States Patent
Stewart

(10) Patent No.: US 11,353,839 B2
(45) Date of Patent: Jun. 7, 2022

(54) NODE AND METHOD OF CONTROLLING DEVICES CONNECTED TO NODE

(71) Applicant: Igor, Inc., Johnston, IA (US)

(72) Inventor: Dwight L. Stewart, Johnston, IA (US)

(73) Assignee: IGOR, INC., Johnston, IA (US)

( * ) Notice: Subject to any disclaimer, the term of this patent is extended or adjusted under 35 U.S.C. 154(b) by 0 days.

(21) Appl. No.: 17/316,282

(22) Filed: May 10, 2021

(65) Prior Publication Data

US 2021/0263491 A1 Aug. 26, 2021

Related U.S. Application Data

(63) Continuation-in-part of application No. 16/833,741, filed on Mar. 30, 2020, now Pat. No. 11,006,509, which is a continuation of application No. 15/993,360, filed on May 30, 2018, now Pat. No. 10,609,790, which is a continuation-in-part of application No. 15/671,992, filed on Aug. 8, 2017, now Pat. No. 10,624,193, which is a continuation of application No. 14/801,522, filed on Jul. 16, 2015, now Pat. No. 9,730,299.

(51) Int. Cl.
| | | |
|---|---|---|
| H05B 47/10 | (2020.01) | |
| G05B 19/042 | (2006.01) | |
| H05B 47/185 | (2020.01) | |
| H05B 47/16 | (2020.01) | |
| H05B 47/175 | (2020.01) | |
| H05B 44/00 | (2022.01) | |
| H05B 45/20 | (2020.01) | |

(52) U.S. Cl.
CPC ........... G05B 19/042 (2013.01); H05B 44/00 (2022.01); H05B 47/10 (2020.01); H05B 47/16 (2020.01); H05B 47/175 (2020.01); H05B 47/185 (2020.01); H05B 45/20 (2020.01); *Y02B 20/40* (2013.01)

(58) Field of Classification Search
CPC ........ H04B 45/46; H04B 45/48; H04B 47/10; H04B 47/16; H04B 47/18; H04B 47/175; H04B 47/185
See application file for complete search history.

(56) References Cited

U.S. PATENT DOCUMENTS

| | | | | |
|---|---|---|---|---|
| 7,508,141 | B2 * | 3/2009 | Wong | H05B 45/32 |
| | | | | 315/185 S |
| 8,807,796 | B2 * | 8/2014 | Li | F21S 4/15 |
| | | | | 362/249.06 |
| 2012/0280637 | A1 * | 11/2012 | Tikkanen | H05B 45/385 |
| | | | | 315/294 |
| 2016/0185288 | A1 * | 6/2016 | Kuang | H05B 47/11 |
| | | | | 315/77 |

* cited by examiner

*Primary Examiner* — Tung X Le
(74) *Attorney, Agent, or Firm* — David M. Breiner; BrownWinick Law Firm

(57) ABSTRACT

Example embodiments relate to a node and a method of controlling devices connected to the node. In example embodiments the devices may be, but are not required to be, lights.

11 Claims, 23 Drawing Sheets

NODE AND METHOD OF CONTROLLING DEVICES CONNECTED TO NODE

CROSS-REFERENCE TO RELATED APPLICATION(S)

This application is a continuation-in-part of U.S. patent application Ser. No. 16/833,741 which was filed with the United States Patent and Trademark Office on Mar. 30, 2020 which in turn is a continuation of U.S. patent application Ser. No. 15/993,360 which was filed with the United States Patent and Trademark Office on May 30, 2018 which in turn is a continuation in part of U.S. patent application Ser. No. 15/671,992 which was filed with the United States Patent and Trademark Office on Aug. 8, 2017 which is a continuation of U.S. patent application Ser. No. 14/801,522 which was filed with the United States Patent and Trademark Office on Jul. 16, 2015, the entire contents of each are herein incorporated by reference.

BACKGROUND

1. Field

Example embodiments relate to a node and a method of controlling devices connected to the node. In example embodiments the devices may be, but are not required to be, lights.

2. Description of the Related Art

Power over Ethernet (PoE) describes a system in which power and data are provided to a device via Ethernet cabling. FIG. 1, for example, illustrates a system 90 utilizing PoE. In FIG. 1 the system 90 includes three powered devices 50, 60, and 70 which may receive power and data from a switch 20. Typical examples of powered devices include IP cameras, IP telephones, wireless access points, switches, sensors, light controllers, and/or lights. Though FIG. 1 shows only three powered devices 50, 60, and 70, it is understood the system 90 is usable to power and control only a single device, two devices, or more than three devices.

In the conventional art, the switch 20 may receive AC power and may distribute the power to a plurality of ports 25 to power the aforementioned devices. In FIG. 1, the switch 20 is illustrated as including twelve ports 25 however it is understood that conventional switches 20 may include more than, or less than, twelve ports 25. Power from the ports 25 is delivered to the powered devices 50, 60, and 70 via conventional Ethernet cables 40.

In the conventional art, the switch 20 may include management software allowing the switch 20 to control how power is delivered to the powered devices 50, 60, and 70. For example, switch 20 may be configured to cycle power to the powered devices 50, 60, and 70. For example, in the event the devices 50, 60, and 70 are lights powered or controlled by the switch 20, the switch 20 may be configured to turn off the lights, or dim them, at times when they are not normally in use. In the alternative, the switch 20 may include a management port allowing an operator to configure the switch 20 or control the switch 20 to manage devices attached to the switch 20. For example, as shown in FIG. 1, the switch 20 may include a port allowing a user 10 to connect thereto to control the powered devices 50, 60, and 70 via the switch 20. In the conventional art, the switch 20 may alternatively be connected to a network which may be accessed by a user. In this latter embodiment, the user may have access to the switch 20, and may control the switch 20 via software that may run on the network or may run on a computer the user operates.

SUMMARY

The inventor has noted that a drawback associated with conventional PoE lighting systems is the potential for lights to either deactivate, simply refuse to turn on in the event a controller, for example, a switch goes offline or loses connectivity. This could present a serious safety issue for occupants of a building who may require light to exit a building. As such, the inventor set out to design a new and nonobvious type of node having an ability to control a device, for example, a light or an alarm, when a controller goes offline.

In accordance with example embodiments, a node may include a microprocessor configured to control a powered device based on data received from a controller and, in the event data communication between the controller and the microprocessor is interrupted or lost, control the powered device independent of the controller. It should be appreciated that in this application a powered device may be any device that receives power from any of the following described nodes.

BRIEF DESCRIPTION OF THE DRAWINGS

Example embodiments are described in detail below with reference to the attached drawing figures, wherein.

DETAILED DESCRIPTION

Figure 1:
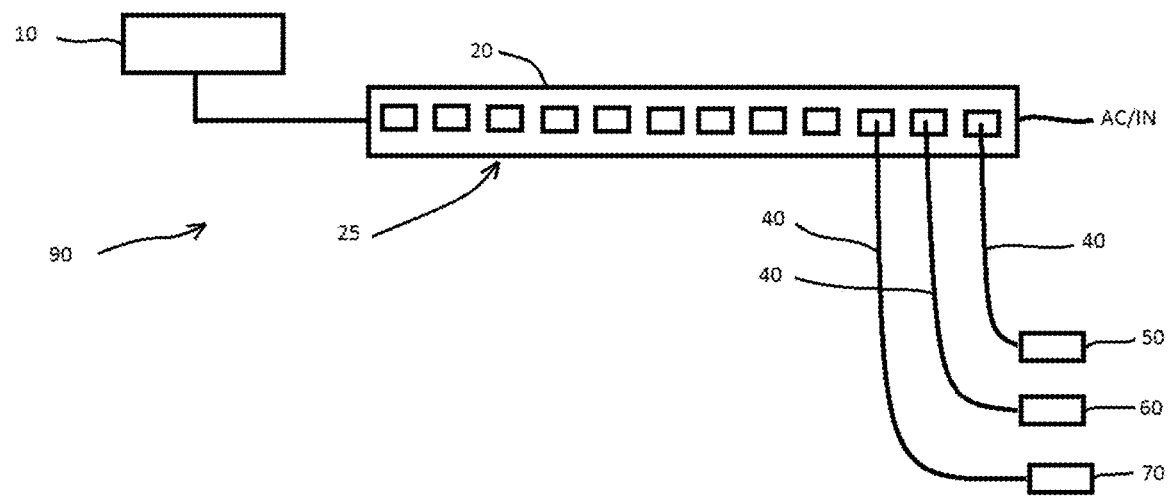
FIG. 1 is a view of a conventional system employing PoE.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature only as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a node and a method of controlling devices connected to the node. In example embodiments the devices may be, but are not required to be, lights and/or alarms.

Figure 2:
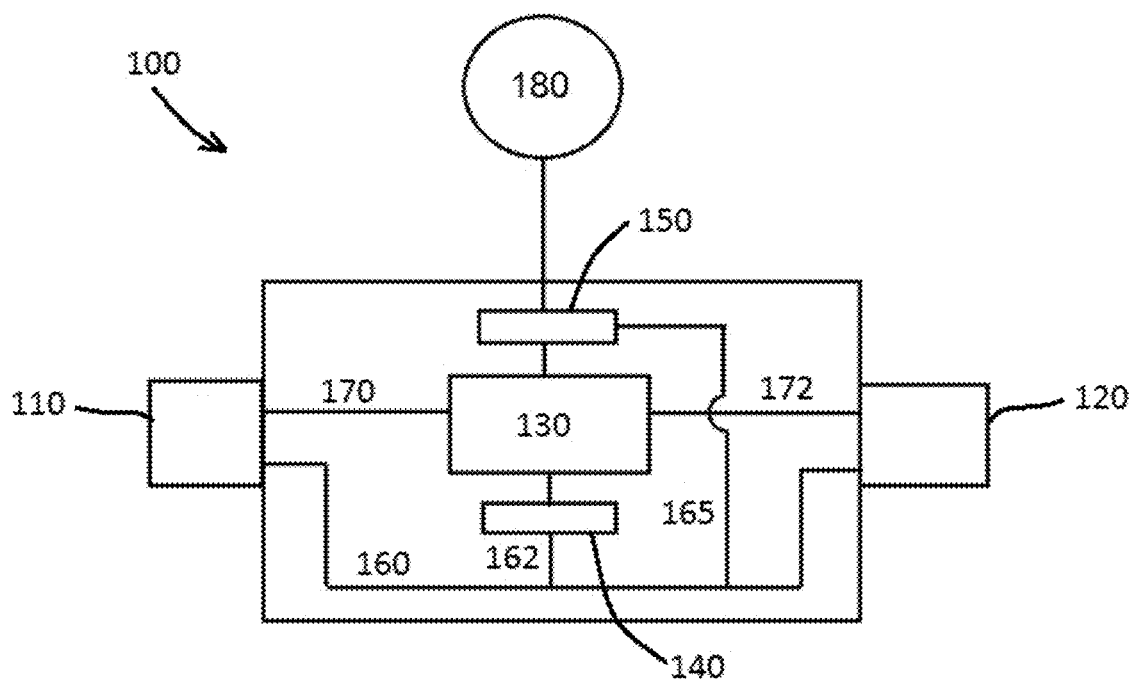
FIG. 2 is a view of a node in accordance with example embodiments.

FIG. 2 is a view of a node 100 in accordance with example embodiments. As shown in FIG. 2, the node 100 may include an input port 110 and an output port 120. In example embodiments, each of the input port 110 and the output port 120 may be configured to receive a conventional Ethernet cable 40. Thus, the node 100 may be capable of receiving both data and power over PoE. For example, in one non-limiting example embodiment, the input port 110 and the output port 120 may be, but is not required to be, configured as a RJ45 connector standardized as an 8P8C modular connector.

In Example embodiments, the node 100 may include a microprocessor 130. The microprocessor 130 may be configured to receive data from the input port 110, control a powered device 180 connected to the node 100, transmit data to the output port 120, receive data from the output port 120, and transmit data to the input port 110. Thus, in example embodiments, data may flow in two directions through the node 100.

In FIG. 2, the node 100 may include a first power source 140 configured to provide power to the microprocessor 130 and a second power source 150 configured to provide power to the powered device 180. In example embodiments, the first and second power sources 140 and 150 may be configured to receive power via conductive lines 160, 162, and 165 which may receive power from the input port 110. For example, when an Ethernet cable 40 is inserted into the input port 110, power may flow to the first power source 140 via the conductive lines 160 and 162 and may also flow to the second power source 150 via conductive members 160 and 165. In example embodiments, the conductive member 160 may terminate at the output port 120. Thus, in example embodiments, power may also flow from the input port 110 to the output port 120 via the conductive member 160.

In FIG. 2, the microprocessor 130 may receive data from the input port 110. For example, in example embodiments, the microprocessor 130 may receive data via a conductive member 170. In example embodiments, the microprocessor 130 may use the data to control the powered device 180. In addition, or in the alternative, the microprocessor 130 may transfer the data to the output port 120 via another conductive member 172. In example embodiments, the microprocessor 130 may also be configured to receive data from the output port 120 and transfer this data to the input port 110. Thus, in example embodiments, data may flow two ways across the node 100.

Figure 3A:
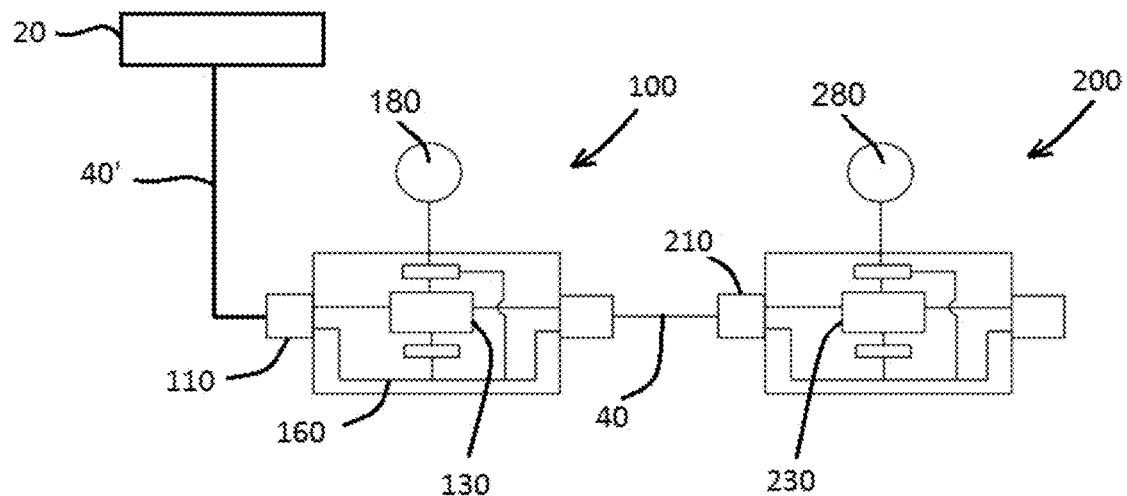
FIGS. 3A and 3B are views of connected nodes in accordance with example embodiments.

FIG. 3A illustrates two nodes 100 and 200 connected to one another. Because node 200 may be substantially identical to node 100, a detailed description thereof is omitted for the sake of brevity. In example embodiments, power and data may be provided to the input port 110 of node 100. For example, the input port 110 of node 100 may be connected to a conventional switch 20 via a PoE cable 40'. In example embodiments, the power from the switch 20 may flow along the conductive member 160 to the output port 120 and through the Ethernet cable 40 to the input port 210 of the second node 200. Thus, in example embodiments, power provided to the input port 110 may be used to power each of the first and second nodes 100 and 200. Similarly, data provided to the first port 110 may be provided to the processor 130 of the first node 100 and to the processor 230 of the second node 200. This data may allow the first node 100 to control the first powered device 180 and/or allow the second node 200 to control a second powered device 280. Also, in example embodiments, data may flow from the second node 200 to the first node 100 via the Ethernet cable 40 and from the first node 100 to the switch 20 via the PoE cable 40'.

Figure 3B:
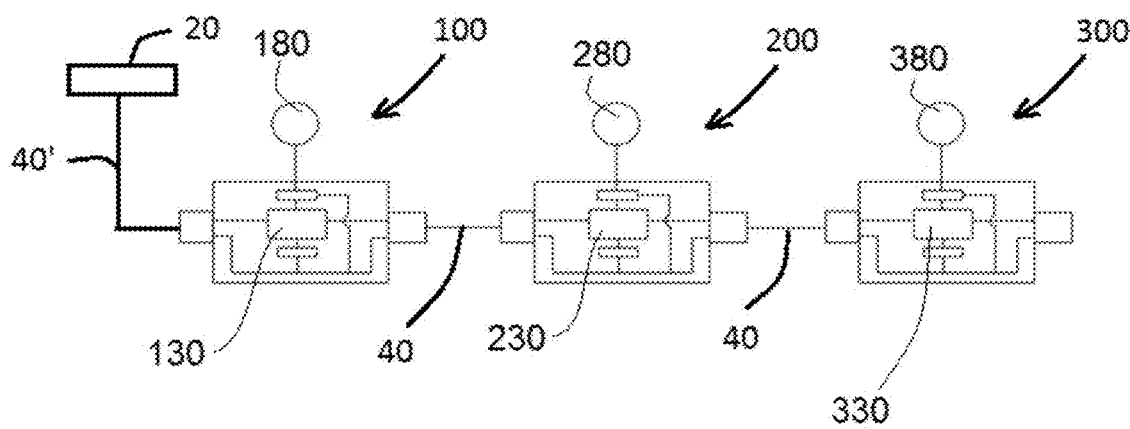

FIG. 3B illustrates three nodes 100, 200, and 300 connected to one another. In example embodiments the second and third nodes 200 and 300 may be substantially identical to the first node 100 and the principles associated with FIG. 3A apply to FIG. 3B. In other words, power and data from a switch 20 may flow to the input port 110 of the first node and the power and data may be provided to the second and third nodes 200 and 300 via Ethernet cables 40. Also, data may flow from the first node 100 to the second node 200 and then the third node 300 and may also flow from the third node 300 to the second node 200, from the second node 200 to the first node 100, and from the first node 100 to the switch 20.

In example embodiments the microprocessors 130, 230, and 330 may control the powered devices 180, 280, and 380 based on data received from the switch 20, however, it is conceivable that the switch 20, or any other device which is configured to control any one of, or all of, the nodes 100, 200, and 300 may go offline thus interrupting data communication between the nodes and the switch 20. This could potentially cause a safety concern where the powered devices 180, 280, and 380 are lights. As such, the microprocessors 130, 230, and 330 may be configured so that if communication between the controller (for example, switch 20) and any one of, or all of, the nodes 100, 200, and 300 is interrupted, the microprocessors 130, 230, and 330 will automatically control their respective powered devices 180, 280, and 380. For example, in the event the powered devices 180, 280, and 380 are lights, the lights may be controlled to a certain dim level by their respective microprocessors. This would assure that persons in a room requiring light which is normally controlled by a switch 20 receive light in the event the switch 20 goes off line.

Figure 4:
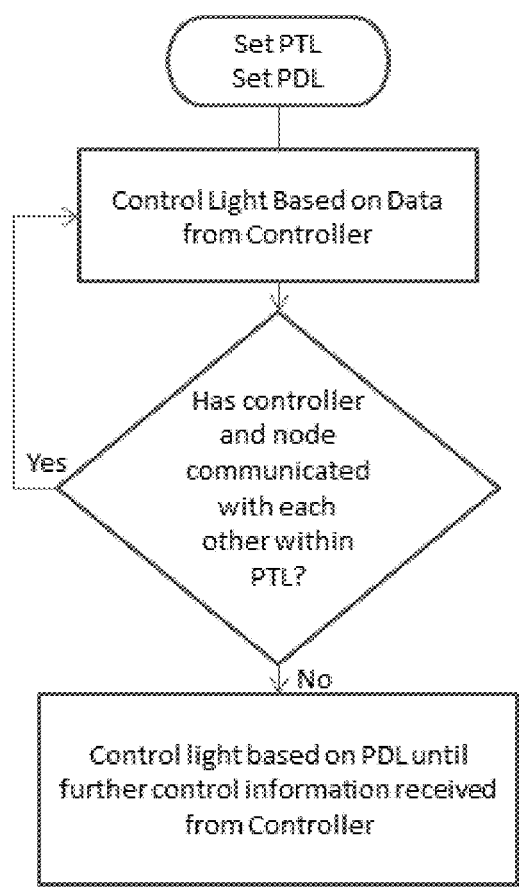
FIG. 4 is a view of a method in accordance with example embodiments.

FIG. 4 is a view of a flowchart illustrating an example of the above mentioned method. For example, in FIG. 4 a predetermined time limit (PTL) and a predetermined dim level (PDL) may be set by a user and stored in some form of electronic memory, for example, an electronic database which is accessible by the microprocessor. The electronic database, for example, may be, but is not required to be, and electronic storage medium such as ROM, PROM, EPROM, or an EEPROM.

In this application PTL and PDS are examples of control parameters a node may use to control a powered device. The PTL and PDL may be set (or stored), for example, when a node is initially fabricated. In the alternative, the PTL and PDL may be set by a user. The PTL, for example, may be any time limit desired by a user. For example, in one embodiment the PTL may be one minute, in another embodiment it may be two minutes. Similarly, the PDL may also be any level desired by a user. For example, in one embodiment, the PDL may be 100%, in another embodiment, the PDL may be about 50%.

The method of FIG. 4 may, for example, be executed by the microprocessor 130 of node 100, however, it could similarly be executed by the microprocessors 230 and/or 330 of nodes 200 and 300. As shown in FIG. 4 the microprocessor 130 may control light based on data from a controller, for example, the switch 20. The microprocessor 130 may, thereafter, monitor whether or not the node 100 has communicated with the controller within PTL. If not, the microprocessor 130 may control the powered device 180. For example, if the powered device 180 is a light, the light may be controlled by the microprocessor 130 to a dim level of PDL.

Example embodiments are not intended to be limited by the aforementioned examples. For example, the electronic memory may store additional control parameters. For example, as alternative to storing a PDL the electronic memory may store a script which may be executed in the event the PTL is exceeded. For example, the powered device 180 may be an LED light capable of producing any number of colors. In this embodiment the microprocessor 130 may cause the LED light to emit a particular color or change from one color to another color in the event the PTL is exceeded. As yet another example, rather than causing a light to change color it might alternatively cause a light to blink. Of course, the node 100 may be configured to execute other actions. For example, in another embodiment the powered device 180 may be an alarm and the node 100 may be configured to send power to the alarm in the event the PTL is exceeded. The alarm, for example, may be an audio alarm and/or a vibration device.

Figure 5:
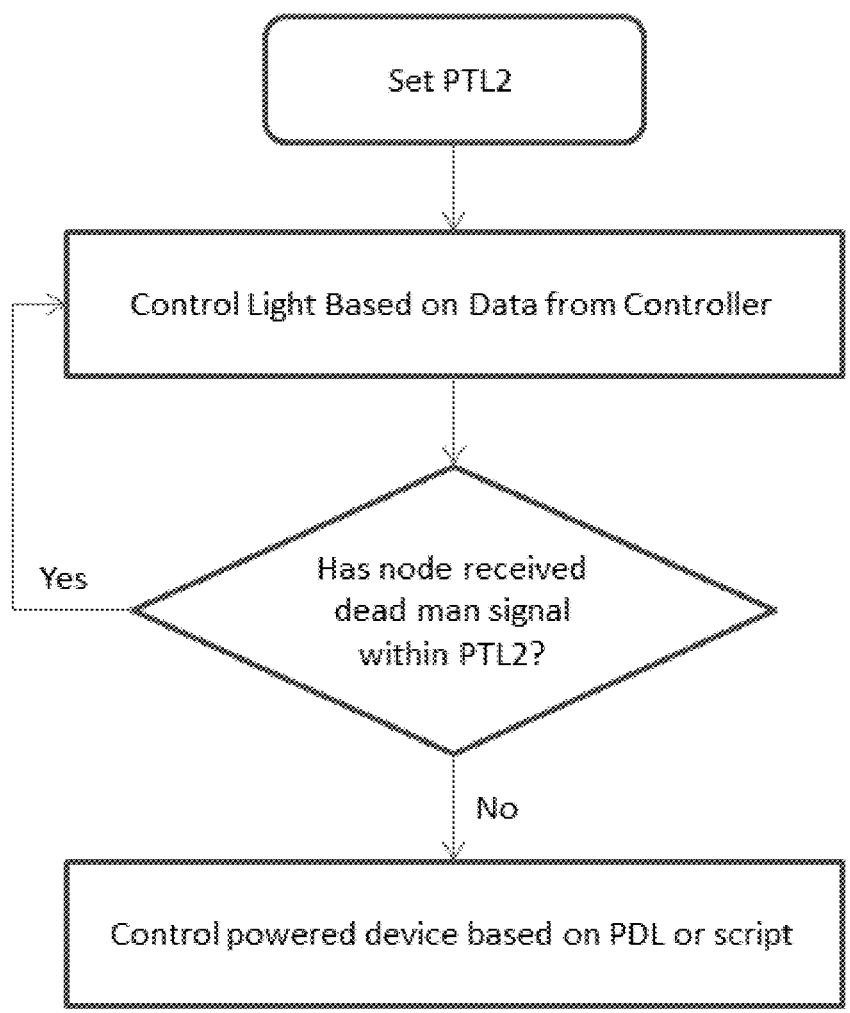
FIG. 5 is a view of a method in accordance with example embodiments.

In example embodiments, the node 100 may be additionally, or alternatively, configured to control the powered device 180 based on a received periodic signal and/or lack thereof. The received periodic signal, for example, may be understood to be a dead man signal generated by a second node that monitors a condition of an element of a system, for example, an AC power source. In one nonlimiting example, the periodic signal may be received from a network switch 20. In one nonlimiting example embodiment, the node 100 may have a memory encoded with instructions that cause the microprocessor 130 to execute a script in the event the node 100 does not receive the periodic (dead man) signal. For example, when the powered device 180 is a light or a light controller, the instructions may cause the microprocessor 130 to control the light or light controller to emit light at dim level which may be a predetermined dim level, when the periodic signal is not received. FIG. 5, for example, illustrates an example of an algorithm which may be executed by the node 100 where PTL2 is a predetermined time limit for which dead man signals may be received by a node. For example, the node 100 may be programmed so that if a dead man signal is not received every 20 seconds (an example of PTL2) then the node will control a powered device based on a predetermined dim level and/or script.

Figure 6A:
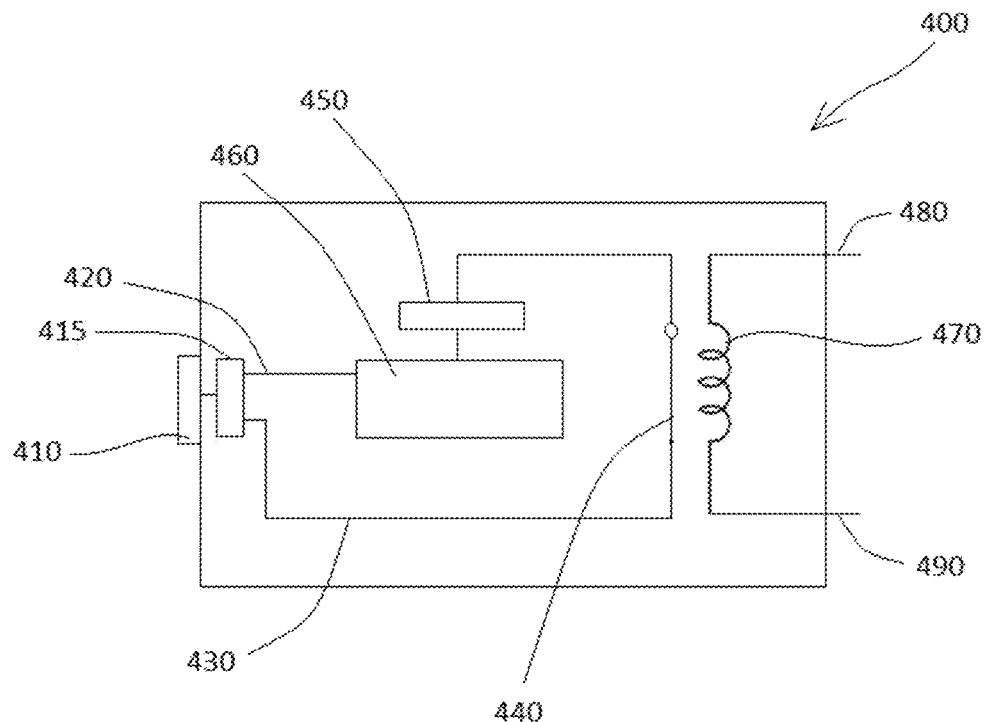
FIG. 6A an 6B are view of a node in accordance with example embodiments.
Figure 6B:
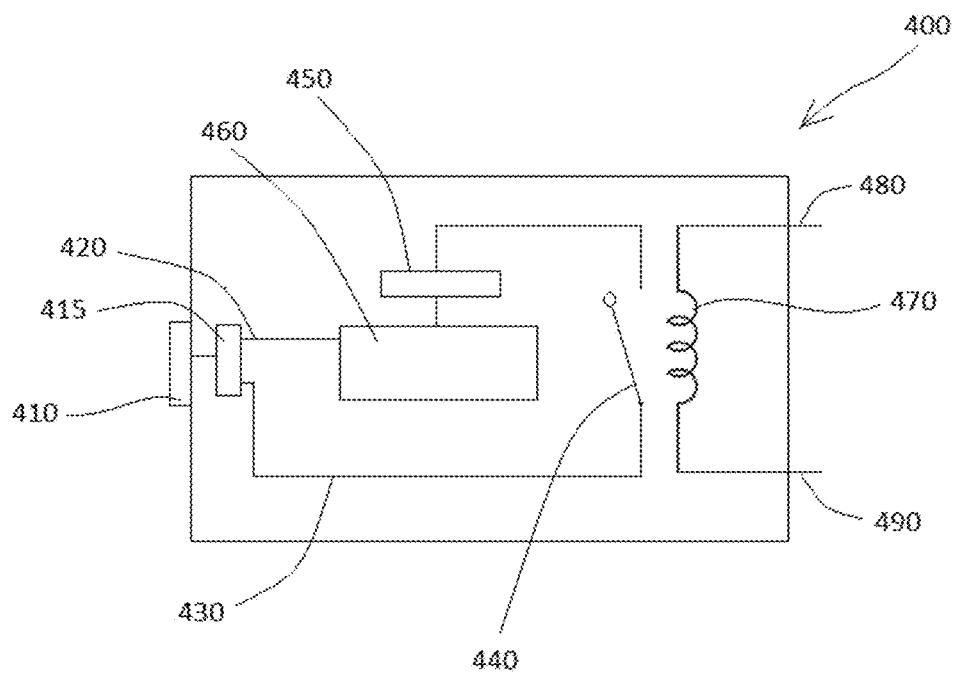

FIGS. 6A and 6B illustrate another example of a node 400 in accordance with an example of the invention. The particular design of the node 400 is illustrative only and is not intended to limit the invention as one skilled in the art would recognize several ways in which a node may be designed to include the inventive features associated with FIGS. 6A and 6B.

In the nonlimiting example of FIGS. 6A and 6B the node 400 is configured to function as a "dead man" node usable for detecting when an AC power source is not functioning properly. Referring to FIGS. 6A and 6B, the node 400 may include a first port 410 which may be configured to receive an end of a conventional Ethernet cable. As such, the port 410 may be, but is not required to be, a RJ-45 connector, or a similar type connector, to receive an end of a conventional Ethernet cord.

In example embodiments, the node 400 may include a circuit usable for monitoring whether an AC power source monitored by the node 400 is functioning properly and if it is, to provide a signal indicating the AC power source is functioning (an example of a dead man signal). In the nonlimiting example of FIGS. 6A and 6B the circuit receives data and power from an Ethernet cable which may be connected to the port 410. The power and the data provided to the port 410 may be forwarded to an isolation circuit 415 of the circuit which may separate the power from the data. The data may be provided to a microprocessor 460 via a conductive line 420 and the microprocessor 460 may execute various operations based on the data. The power from the isolation circuit 415 may be routed via a conductive line 430 to a switch 440 which may interact with a relay coil 470 so that when the relay coil 470 is energized the switch 440 is closed allowing power to flow to a power source 450 which may power the microprocessor 460. The power source, for example, may provide 3.3 vdc to the microprocessor 460. The microprocessor 460 may periodically send a signal to the port 415 when the relay coil 470 is energized by AC power. For example, the relay coil 470 may be connected to contacts 480 and 490 of node 400 which may connect to the AC power source. If AC power is provided to the relay coil 470 the switch 440 may remain closed and power may be provided to the microprocessor 460 to enable the microprocessor 460 to generate and send the aforementioned signal to the port 410 on a periodic basis. However, if the AC power is interrupted, the switch 440 may open, as shown in FIG. 6B, thus interrupting power to the microprocessor 460. In such a case, the microprocessor 460 would be unable to send a signal to the port 410.

Figure 7A:
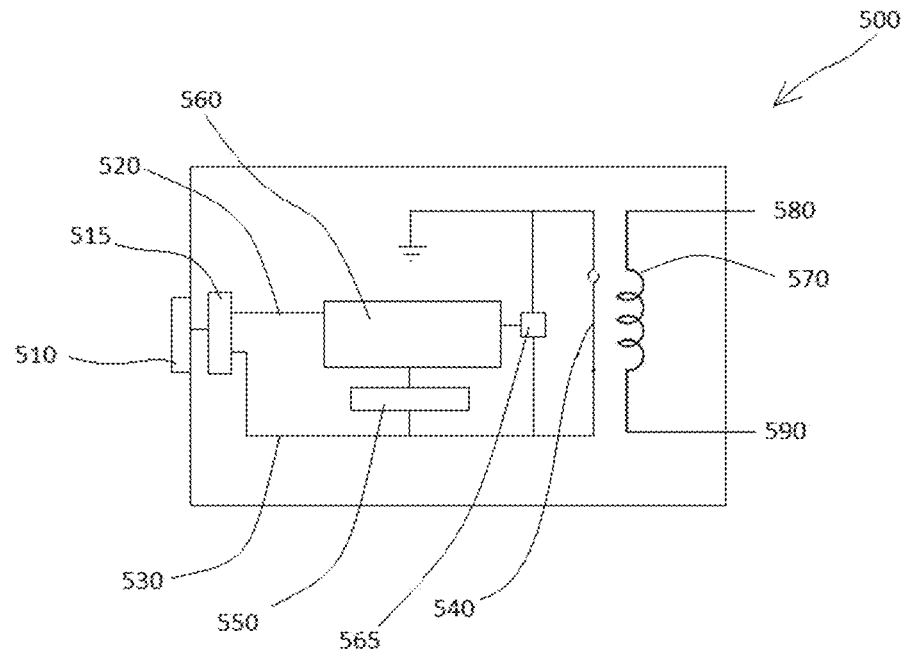
FIG. 7A an 7B are view of a node in accordance with example embodiments.
Figure 7B:
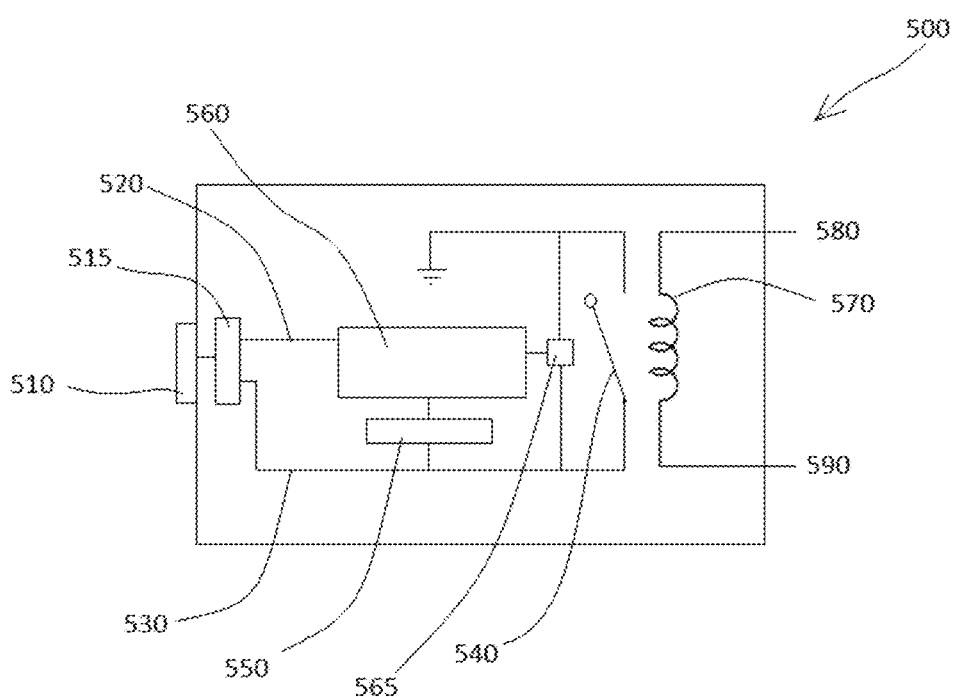

FIGS. 7A and 7B illustrate another example of a node 500 which may also function as a dead man node. Like node 400, node 500 is provided to illustrate the inventive concepts and is provided for purposes of illustration rather than limitation. Like node 400, node 500 may include a port 510 configured to interface with a conventional Ethernet cable. As such, port 510 may be, but is not required to be, an RJ-45 connector, or a similar type connector, to receive an end of a conventional power over Ethernet cord.

In example embodiments, the node 500 may include a circuit usable for monitoring whether an AC power source monitored by the node 500 is functioning properly and if it is, to provide a signal indicating the AC power source is functioning. In the nonlimiting example of FIGS. 7A and 7B the circuit receives data and power from an Ethernet cable which may be connected to the port 510. The power and the data provided to the port 510 may be forwarded to an isolation circuit 515 of the circuit which may separate the power from the data. The data may be provided to a microprocessor 560 via a conductive line 520 and the microprocessor 560 may execute various operations based on the data. The power from the isolation circuit 515 may be routed via a conductive line 530 to a power source 550 to power the microprocessor 560. For example, the power source 550 may be configured to provide 3.3 vdc to the microprocessor 560. The circuit of node 500 may further include a switch 540 which may interact with a relay coil 570 so that when the relay coil 570 is energized the switch 540 is closed. The relay coil 570 may be connected to contacts 580 and 590 which may connect to an AC power source. The circuit may further include a voltage and/or current monitoring chip 565 which may monitor a voltage drop across the switch 540 or current flowing through the switch 540. In the event the switch 540 is closed the voltage drop across the switch is very low, however, if the switch 540 is open, for example, because the relay coil 570 is no longer energized by the AC source, the voltage across the switch 540 increases. The voltage monitoring chip 565 may send a signal indicative of the increased voltage and may send the signal to the microprocessor 560. The microprocessor 560 may be configured to cease sending a signal to port 510 in response to the signal received from the voltage monitoring chip 565.

Nodes 400 and 500 share various inventive features in common. For example, each node 400 and 500 includes a port 410, 510 configured to interface with a conventional Ethernet cable and each circuit includes a relay switch 440, 540 coupled to a relay coil 470, 570 usable for monitoring an AC power source. Further yet, each circuit include a microprocessor 460, 560 configured to send a signal, on a periodic basis, to the port 410, 510 in the event the relay coils 470, 570 are properly energized by their respective AC sources. Further yet, each node 400, 500 is configured to cease sending the signals in the event their respective relay coils 470, 570 are not properly energized by their respective AC sources. In other words, each node 400 and 500 is configured to monitor an AC source, send signals to a conventional Ethernet cable in the event the AC source is properly functioning, and quit sending the signals in the event the AC source fails to function properly.

Figure 8:
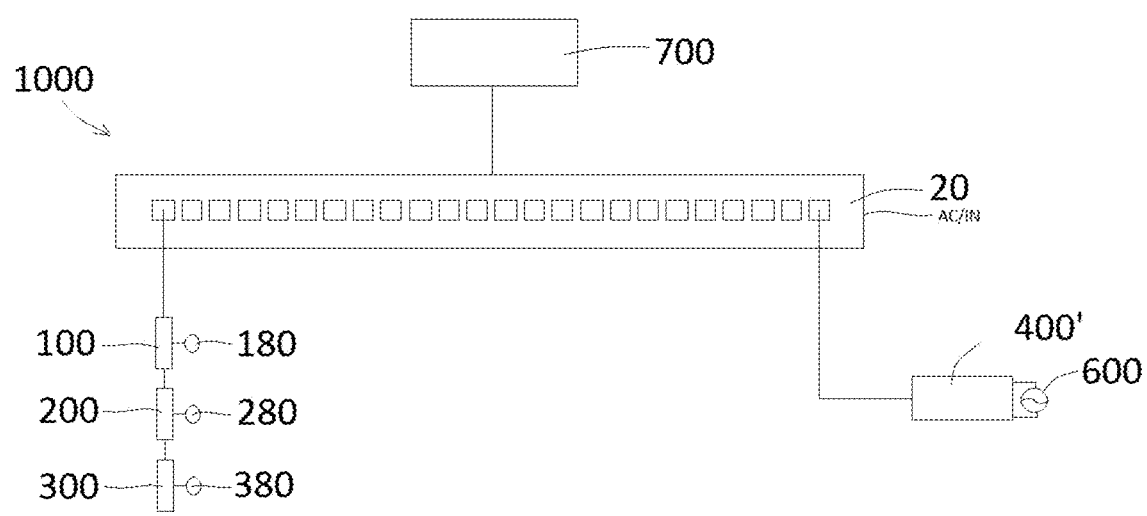
FIG. 8 is a view of a system in accordance with example embodiments.

FIG. 8 is a view of a system 1000 comprising a network switch 20, a computer 700 connected to the network switch 20, at least one dead man node 400' (which may, for example, be node 400 or 500 or a variant thereof) monitoring an AC source 600, and at least one node 100 configured to control a powered device 180 which may be, for example, a light, for example, and LED light or an array of LED lights. The system 1000 may further include nodes 200 and 300 daisy chained to node 100 as previously described. In this particular nonlimiting embodiment, the node 400' may be connected to an AC source and the microprocessors 460 or 560 of the node 400' may be configured to send a signal, on a periodic basis, to the network switch 20 via a conventional Ethernet cable 40 when the AC source 600 is properly functioning. The network switch 20 may send this signal to the computer 700 which may, in turn, send this signal to several other systems, not shown. The network switch 20 may also send the signals from the dead man node 400' to the at least one node 100 which may be configured to control the powered device 180 in a predetermined manner. For example, in the event the AC source 600 fails, the dead man node 400' would cease sending the signals on a periodic basis and the node 100 would respond by executing a script to control the powered device 180 and/or operate the powered device 180 at a predetermined level, for example, a predetermined dim level, in the event the powered device 180 is a light, for example, an LED light. Nodes 200 and 300 may operate in a similar way.

Figure 9:
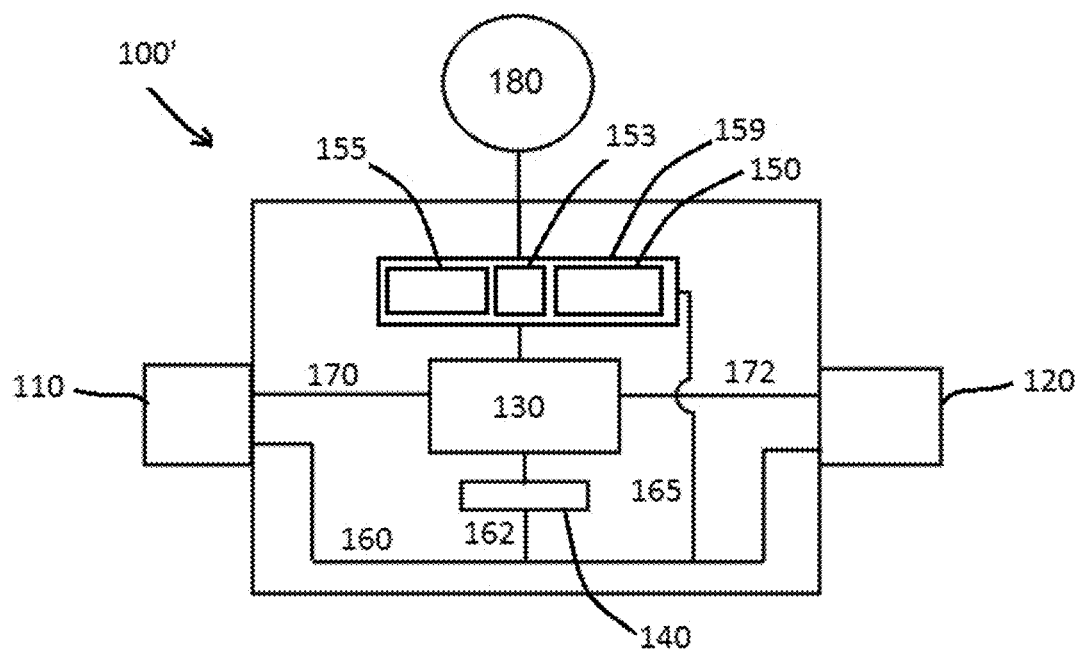
FIG. 9 is a view of a node in accordance with example embodiments.

FIG. 9 is an example of another node 100' in accordance with example embodiments. In example embodiments, the node 100' may be substantially identical to node 100 except that node 100' includes a power source 155 and a relay 153. It is noted that node 100', in another embodiment, may omit the relay 153 and the power source 155 may be trickle charged. The power source 155 may be, for example, a battery with circuitry 159 configured to provide power to the powered device 180 and the power source 150 may obtain power from the Ethernet as described previously. In FIG. 9 the relay 153 may determine whether the powered device 180 receives power from the power source 155 or the power source 150. For example, in the event power to node 100' is interrupted, the relay 153 may cause the node 100' to receive power from the battery 155. In example embodiments, if a dead man signal is not received by node 100' in a timely manner, the microprocessor 130 may control the powered device 180 using power from the power source 155 rather than power source 150 which is energized via power over Ethernet. In this nonlimiting example embodiment, the power source 155 may be configured to provide power at a sufficient level to power the device 180. For example, if the powered device 180 is a light emitting diode, the power source 155 may be configured to provide power so that the light emitting diode emits light at a desired dim level. In a similar embodiment, node 100' may be configured so that if no power flows to node 100', for example, at port 110, the relay 153 causes the node 100' to be powered by the battery 155. In this embodiment, the microprocessor 130 may be configured to control the powered device 180 in a predetermined manner if it receives power from the battery 155, irrespective of receiving expected data. For example, in the event the powered device 180 is a light, the microprocessor 130 may control power to the powered device 180 so that is emits light at a certain dim level when the node 100' is powered by the battery 155' rather than the system its attached to. It is understood that certain aspects of the node 100' may be modified without departing from the spirit of the invention. For example, in node 100' the power source 155 and relay 153 may be external to the node 100'.

Figure 10:
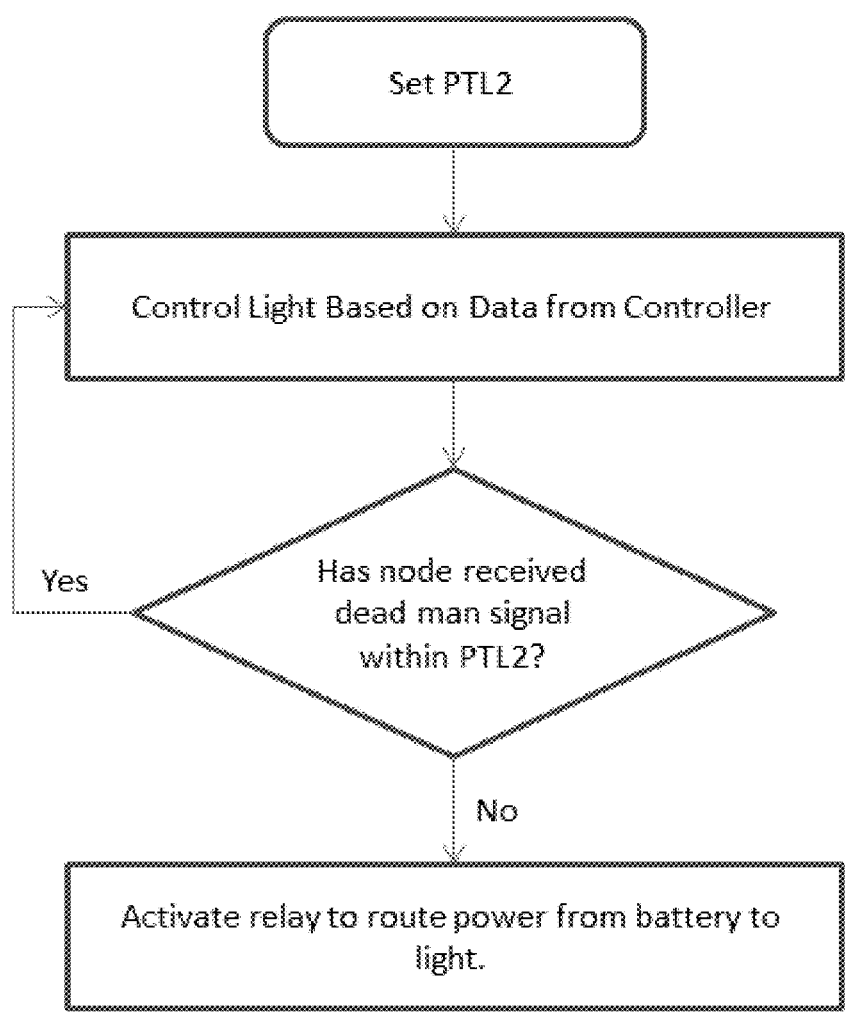
FIG. 10 is a view of a method in accordance with example embodiments.

FIG. 10 is an example of a method that may be utilized by a system that includes node 100'. As shown in FIG. 10, the method may include a step of defining a predetermined time limit (PTL2) which the microprocessor 130 may use to determine whether a dead man signal has been timely received by node 100'. If a dead man signal is timely received the microprocessor 130 controls a light based on data from a controller. If the dead man signal is not timely received the microprocessor 130 activates the relay 153 to route power from the second power source 155 (which may be a battery) to the powered device 180 which may be a light.

Figure 11:
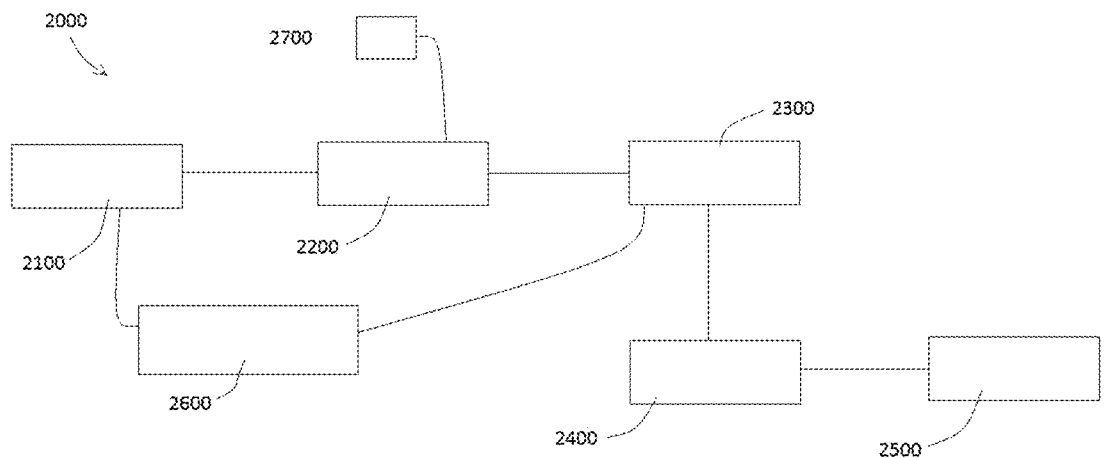
FIG. 11 is a view of a system in accordance with example embodiments.

FIG. 11 is a view of a system 2000 in accordance with example embodiments. As shown in FIG. 11, the system 2000 may be comprised of a data generator 2100 (for example, a gateway), a network switch 2200, a PoE network switch 2300, a node 2400, and powered device 2500, for example, an LED array, connected to the node 2400. In example embodiments, the data generator 2100 may generate data which may be delivered to the network switch 2200. The data, for example, may be sent periodically, for example, every 1 millisecond, 1 second, 2 seconds, or whatever is desired by an owner of the system 2000. On the other hand, the data may not be generated periodically. In example embodiments the node 2400 may be connected to the PoE network switch 2300 by a conventional Ethernet cable. As such, the node 2400 may receive both power and data from the PoE network switch 2300 and may use the power and data to power and control the powered device 2500. In the nonlimiting example of FIG. 11 the data generator 2100 and the PoE switch 2300 may be powered by an A/C power supply with a backup 2600 and the network switch 2200 may be powered by an A/C power supply 2700 which does not have a power back up. In example embodiments the A/C power supply with backup 2600 may or may not be UL 924 rated.

In the embodiment of FIG. 11 the data generator 2100 may be configured to send "expected data" to the network switch 2200 which in turn forwards the "expected data" to the PoE switch 2300 which in turn forwards the "expected data" to the node 2400. In example embodiments, the data generator 2100 may be configured to send the "expected data" on a periodic basis, for example, every one second, two seconds, three seconds, or whatever is desired by the system owner. In this example, the "expected data" may be embodied as a "heartbeat signal," which is an electronic signal generated on a periodic basis. On the other hand, the expected data may be generated on a nonperiodic basis and therefore may resemble an electronic signal which includes "expected data" which may or may not be sent on a periodic basis. In example embodiments, the node 2400 may be configured to control the powered device 2500 based on data received from the PoE switch 2300. In addition, the node 2400 may be further configured to automatically control the powered device 2500 if it fails to receive the "expected data" for more than a predetermined time period. For example, if the node 2400 fails to receive the "expected data" for more than ten seconds (or whatever is considered suitable by the system owner), the node 2400 may control the powered device 2500 automatically. For example, the node 2400 may control the powered device 2500 to generate light at a predetermined dim level or may execute a script to control the powered device 2500. In the example of FIG. 11, it is possible power to the system 2000 may be interrupted for a period of time. However, since the data generator 2100 and the PoE switch 2300 are connected to an A/C power supply with backup 2600, the data generator 2100 and the PoE switch 2300 may continue to receive power from the A/C power supply with backup 2600. By virtue of the connection to the PoE switch 2300, the node 2400 may also receive power from the A/C power supply with backup 2600 to power the powered device 2500. However, in the example of FIG. 11, because the first network switch 2200 may be connected to an A/C power supply 2700 without a backup power, the A/C power supply 2700 may cease providing power to the network switch 2200. If the network switch 2200 does not receive power from the power source 2700 the network switch 2200 may go offline and/or be unable to forward the "expected data" from the data generator 2100. As such, if power to the system 2000 is disrupted and/or the A/C power supply 2700 fails to deliver power to the network switch 2200, and/or the network switch 2200 goes offline, the "expected data" would not flow from the network switch 2200 to the to the PoE switch 2300 and therefore would be unable to flow to the node 2400. If the power to the network switch 2200 is down for too long, for example, longer than a preset time value, such that the "expected data" is not received by the node 2400 within a preset time value, the node 2400 may control the powered device 2500 as described above.

In FIG. 11, the powered device 2500 may, in one embodiment, not receive power from the node 2400. In this nonlimiting example embodiment, the powered device 2500 may receive power from another source, not shown. For example, the powered device 2500 may be connected to a battery or another type of power source, for example, AC power. In this nonlimiting example embodiment, the node 2400 may send control signals to the device 2500 to control the powered device 2500 in the event the node 2400 fails to receive expected data. For example, the powered device 2500 could be a light powered by AC power and the node 2400 may, in the event it does not receive an expected data, may send a control signal to the powered device 2500 to adjust its dim level.

Figure 12:
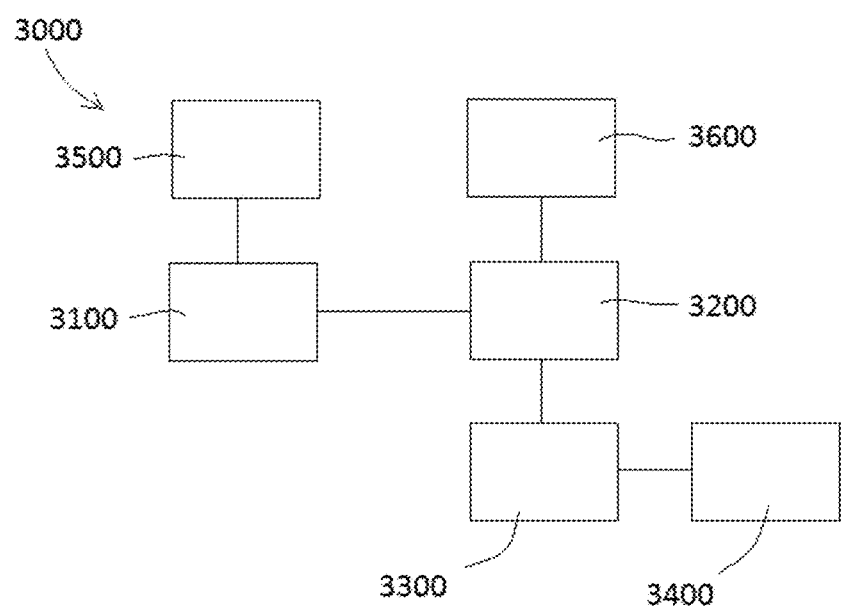
FIG. 12 is a view of a system in accordance with example embodiments.

FIG. 12 is a view of a system 3000 in accordance with example embodiments. As shown in FIG. 12, the system 3000 may be comprised of a data generator 3100 (for example, a gateway), a PoE network switch 3200, a node 3300, and a powered device 3400, for example, an LED array, connected to the node 3300. In example embodiments, the data generator 3100 may generate data on a periodic basis, for example, every 1 second, 2 seconds, 3 seconds, or whatever is desired. On the otherhand, this is not critical to the invention since the data generated by the data generator 3100 does not have to be generated on a periodic basis. In example embodiments the node 3300 may be connected to the PoE network switch 3200 by a conventional Ethernet cable. As such, the node 3300 may receive both power and data from the PoE network switch 3200 and may use the power and data to power and control the powered device 3400. In the nonlimiting example of FIG. 12, the PoE switch 3200 may be powered by an A/C power supply with a backup 3600 and the data generator 3100 may be powered by an A/C power supply 3500 which does not have a power back up. In example embodiments the A/C power supply with backup 3600 may or may not be UL 924 rated.

In the embodiment of FIG. 12 the data generator 3100 may be configured to send "expected data" to the PoE switch 3200 which in turn forwards the "expected data" to the node 3300. In example embodiments, the data generator 3100 may be configured to send the "expected data" on a periodic basis, for example, every one second, two seconds, three seconds, or whatever is desired by the system owner, however, the data generator 3100 is not required to send the "expected data" on a periodic basis. In example embodiments, the node 3300 may be configured to control the powered device 3400 based on data received from the PoE switch 3200. In addition, the node 3300 may be further configured to automatically control the powered device 3400 if it fails to receive the "expected data" for more than a predetermined time period. For example, if the node 3300 fails to receive the "expected data" for more than ten seconds (or whatever is considered suitable by the system owner), the node 3300 may control the powered device 3400 automatically. For example, the node 3300 may control the powered device 3400 to generate light at a predetermined dim level or may execute a script to control the powered device 3400.

In the example of FIG. 12, it is possible power to the system 3000 may be interrupted for a period of time. However, since the PoE switch 3200 is connected to an A/C power supply with backup 3600, the PoE switch 3200 may continue to receive power from the A/C power supply with backup 3600. By virtue of the connection to the PoE switch 3200, the node 3300 may also receive power from the A/C power supply with backup 3600 to power the powered device 3400. However, in example embodiments, because the data generator 3100 is connected to an A/C power supply 3500 without a backup power, the A/C power supply 3500 may cease providing power to the data generator 3100. If the data generator 3100 does not receive power from the power source 3500 the data generator 3100 may go offline and/or may be unable to generate or send the "expected data" to the PoE switch 3200. As such, if power to the system 3000 is disrupted and/or the A/C power supply 3500 fails to deliver power to the data generator 3100 and/or the data generator 3100 goes offline, the node 3300 may control the powered device 3400 automatically as described above.

Figure 13:
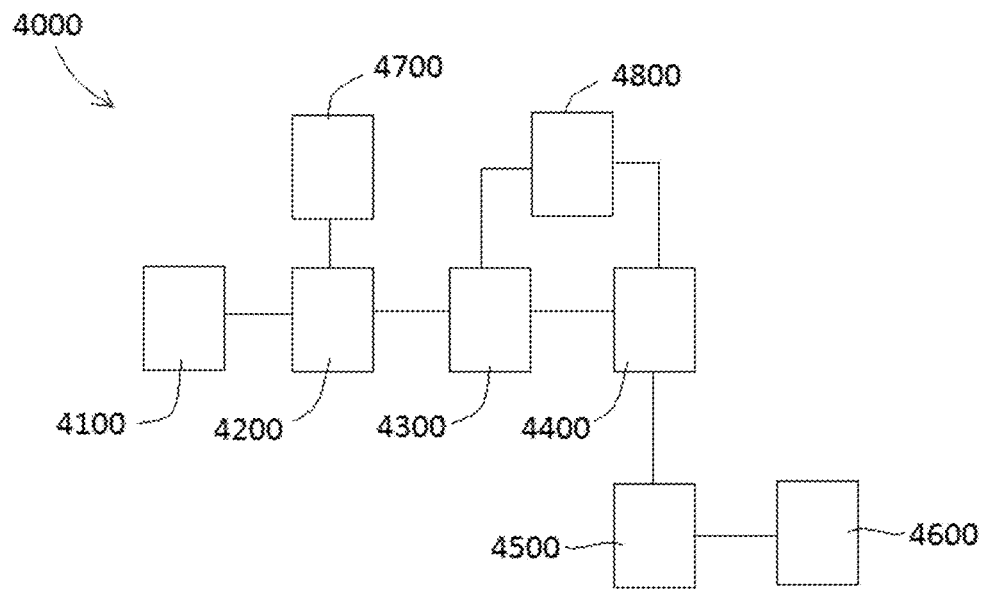
FIG. 13 is a view of a system in accordance with example embodiments.

FIG. 13 is a view of a system 4000 in accordance with example embodiments. As shown in FIG. 13, the system 4000 may be comprised of a data generator 4100 (for example, a node powered via PoE) which may be configured to generate data, a first PoE network switch 4200, an intermediate electronic device 4300 (for example, a gateway), a second PoE network switch 4400, a node 4500, and powered device 4600, for example, an LED array, connected to the node 4500. In example embodiments the data generator 4100 may generate data on a periodic basis, for example, every 1 second, 2 seconds, 3 seconds, or whatever period of time is desired. However, the invention is not limited thereto. For example, rather than generating data on a periodic basis, the data may be generated on a nonperiodic basis. In example embodiments the node 4500 may be connected to the PoE network switch 4400 by a conventional Ethernet cable. As such, the node 4500 may receive both power and data from the PoE network switch 4400 and may use the power and data to power and control the powered device 4600. In the nonlimiting example of FIG. 13, the data generator 4100 may be connected to the first PoE network switch 4200 by a conventional Ethernet cable. As such, the signal generator 4100 may receive power from the first PoE network switch 4200 and data may flow between the signal generator 4100 and the first PoE switch 4200. The second PoE switch 4400 and the intermediate electronic device 4300 may be powered by an A/C power supply with a backup 4800 and the first PoE network switch 4200 may be powered by an A/C power supply 4700 which does not have a power back up. In example embodiments the A/C power supply with backup 4800 may or may not be UL 924 rated.

In the embodiment of FIG. 13 the data generator 4100 may be configured to send "expected data" to the first PoE switch 4200 which in turn forwards the "expected data" to the intermediate electronic device 4300 which in turn forwards the "expected data" to the second PoE switch 4400 which in turn forwards the "expected data" to the node 4500. In example embodiments, the data generator 4100 may be configured to send the "expected data" on a periodic basis, for example, every one second, two seconds, three seconds, or whatever is desired by the system owner. On the other hand, the data generator 4100 may not be configured to send the "expected data" on a periodic basis. In example embodiments, the node 4500 may be configured to control the powered device 4600 based on data received from the second PoE switch 4400. In addition, the node 4500 may be further configured to automatically control the powered device 4600 if it fails to receive the "expected data" for more than a predetermined time period. For example, if the node 4500 fails to receive the "expected data" signal for more than ten seconds (or whatever is considered suitable by the system owner), the node 4500 may control the powered device 4600 automatically. For example, the node 4500 may control the powered device 4600 to generate light at a predetermined dim level or may execute a script to control the powered device 4600.

In the example of FIG. 13, it is possible power to the system 4000 may be interrupted for a period of time. However, since the intermediate electronic device 4300 and the second PoE switch 4400 are connected to an A/C power supply with backup 4800, the intermediate electronic device 4300 and the PoE switch 4400 may continue to receive power from the A/C power supply with backup 4800. By virtue of the connection to the PoE switch 4400, the node 4500 may also receive power from the A/C power supply with backup 4800 to power the powered device 4600. However, in example embodiments, because the first network PoE switch 4200 is connected to an A/C power supply 4700 without a backup power, the A/C power supply 4700 may cease providing power to the first PoE network switch 4200. If the first PoE network switch 4200 does not receive power from the power source 4700 the first PoE network switch 2200 may be unable to power the signal generator 4100 and/or forward the "expected data" signal from the signal generator 4100. As such, if power to the system 4000 is disrupted and/or the A/C power supply 4700 fails to deliver power to the first PoE network switch 4200, the node 4500 may not receive the "expected data" and may control the powered device 4600 as described above.

Figure 14:
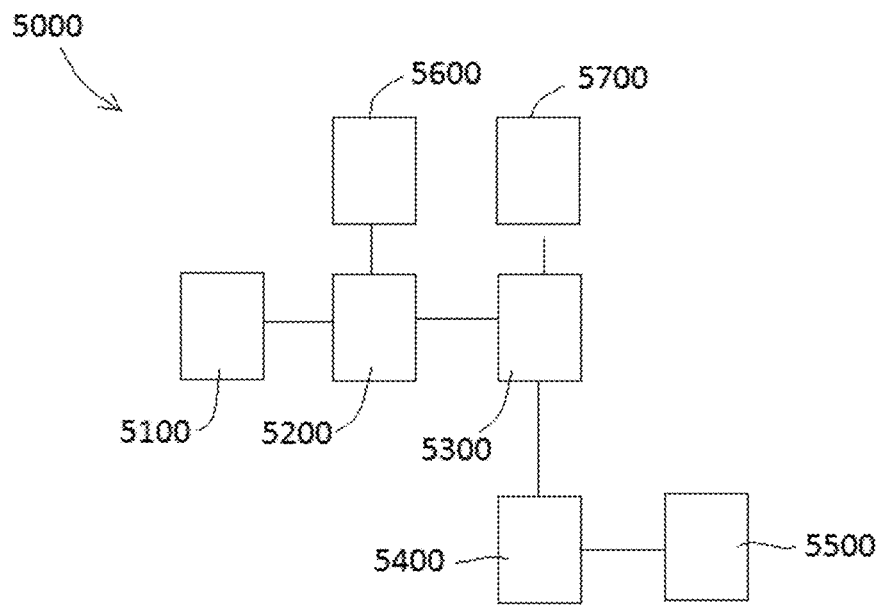
FIG. 14 is a view of a system in accordance with example embodiments.

FIG. 14 is a view of a system 5000 in accordance with example embodiments. As shown in FIG. 14, the system 5000 may be comprised of a data generator 5100 (for example, a node powered via PoE), a first PoE network switch 5200, a second PoE network switch 5300, a node 5400, and a powered device 5500, for example, an LED array, connected to the node 5400. In example embodiments the node 5400 may be connected to the PoE network switch 5300 by a conventional Ethernet cable. As such, the node 5400 may receive both power and data from the PoE network switch 5300 and may use the power and data to power and control the powered device 5500. In the nonlimiting example of FIG. 14 the signal generator 5100 may be connected to the first PoE network switch 5200 by a conventional Ethernet cable. As such, the data generator 5100 may receive power and data from the first PoE network switch 5200 and data may flow between the data generator 5100 and the first PoE switch 5200. The second PoE switch 5300 may be powered by an A/C power supply with a backup 5700 and the first PoE network switch 5200 may be powered by an A/C power supply 5600 which does not have a power back up. In example embodiments the A/C power supply with backup 5700 may or may not be UL 924 rated.

In the embodiment of FIG. 14 the data generator 5100 may be configured to send "expected data", for example, a "heartbeat signal," to the first PoE switch 5200 which in turn forwards the "expected data" to the second PoE switch 5300 which in turn forwards the "expected data" to the node 5400. In example embodiments, the data generator 5100 may be configured to send the "expected data" on a periodic basis, for example, every one second, two seconds, three seconds, or whatever is desired by the system owner. On the other hand, the data generator 5100 may not send the "expected data" on a periodic basis. Nevertheless, in example embodiments, the node 5400 may be configured to control the powered device 5500 based on data received from the second PoE switch 5300. In addition, the node 5400 may be further configured to automatically control the powered device 5500 if it fails to receive the "expected data" for more than a predetermined time period. For example, if the node 5400 fails to receive the "expected data" for more than ten seconds (or whatever is considered suitable by the system owner), the node 5400 may control the powered device 5500 automatically. For example, the node 5400 may control the powered device 5500 to generate light at a predetermined dim level or may execute a script to control the powered device 5500.

In the example of FIG. 14, it is possible power to the system 5000 may be interrupted for a period of time. However, since the second PoE switch 5300 is connected to an A/C power supply with backup 5700, the PoE switch 5300 may continue to receive power from the A/C power supply with backup 5700. By virtue of the connection to the PoE switch 5300, the node 5400 may also receive power from the A/C power supply with backup 5700 to power the powered device 5500. However, in example embodiments, because the first network PoE switch 5200 is connected to an A/C power supply 5600 without a backup power, the A/C power supply 5600 may cease providing power to the first PoE network switch 5200. If the first PoE network switch 5200 does not receive power from the power source 5600 the first PoE network switch 5200 may be unable to power the data generator 5100 and/or forward the "expected data" from the data generator 5100. As such, if power to the system 5000 is disrupted and/or the A/C power supply 5600 fails to deliver power to the first PoE network switch 5200, the node 5400 may control the powered device 5500 as described above.

Figure 15A:
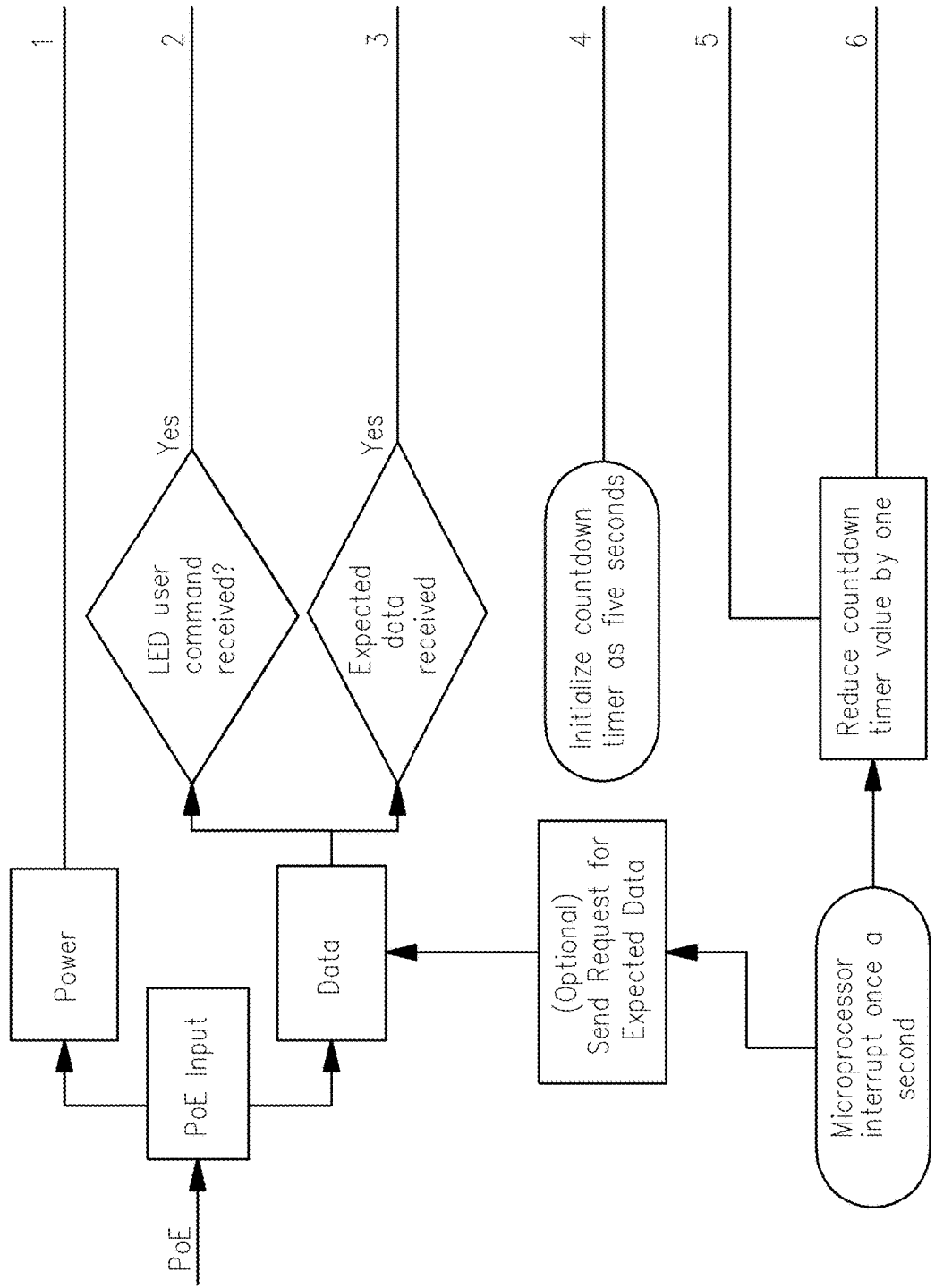
FIGS. 15A and 15B are a method in accordance with example embodiments.

The above example systems are illustrative only and are not meant to limit the invention and those of ordinary skill in the art would readily appreciate the inventive concepts disclosed herein may be adapted to other systems. FIGS. 15A and B illustrate an example of a method which may be implemented by any one of the nodes described in this application, for example, nodes 2400, 3300, 4500, and 5400. The method is provided for illustrative purpose only and is not intended to limit the invention.

Figure 15B:
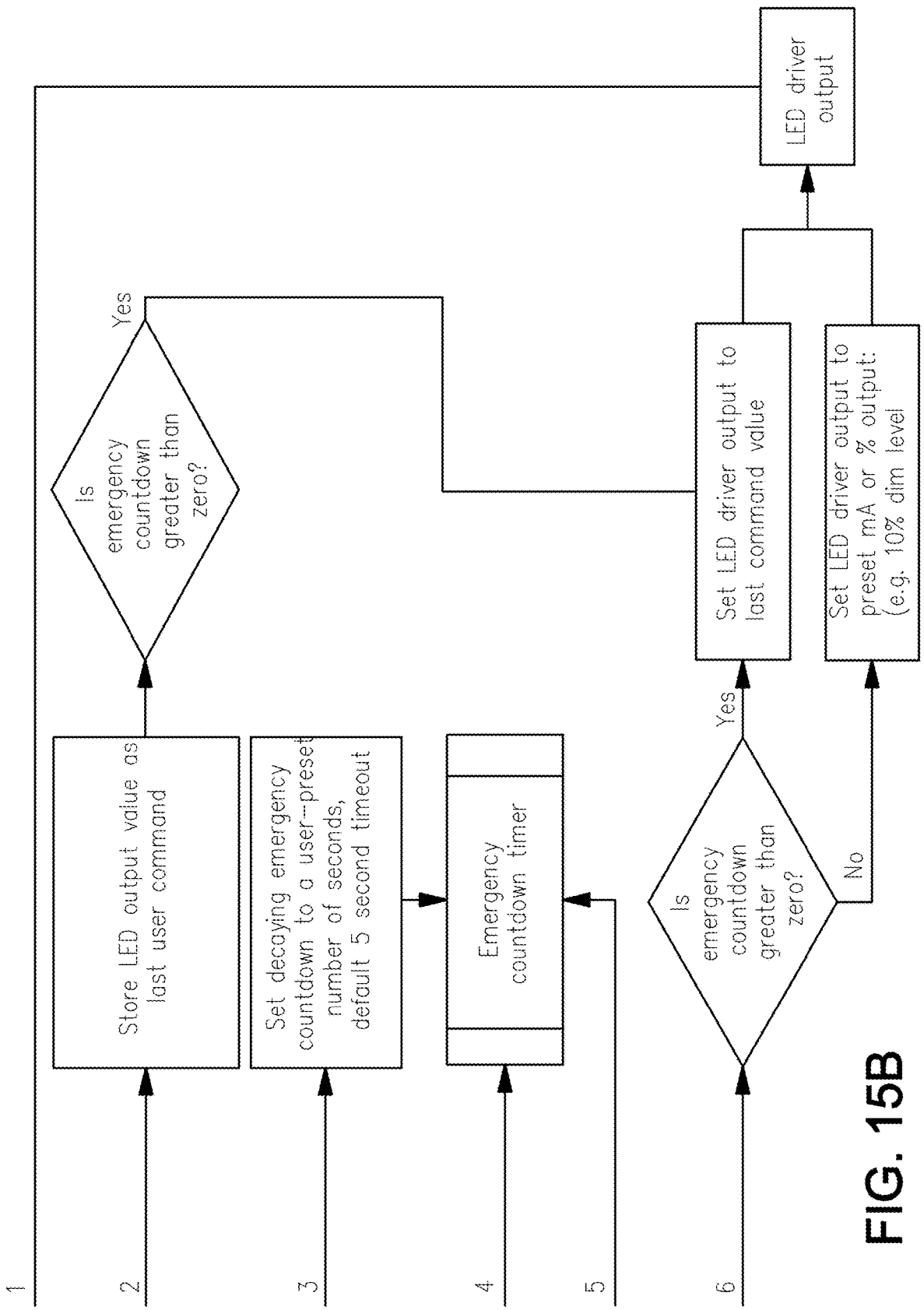

As shown in FIGS. 15A and 15B the method may be executed by a node that receives both power and data over a conventional Ethernet cable. For example, any one of the previously described nodes, for example, nodes 2400, 3300, 4500, and 5400, may include a port configured as a RJ45 connector standardized as an 8P8C modular connector or some other similar port useable to connect with a conventional Ethernet cable. In example embodiments, the node may include circuitry to extract the power and data provided at the port and provide at least a portion of the power to a driver that may control a powered device (for example, an LED driver that drives and LED array) connected to the node and data to a microcontroller of the node. The data may contain control commands (for example, LED user commands) and/or "expected data". In the event the data includes control commands the microcontroller may store output values as a "last user command." In this method, the expected data may, in fact, be an LED user command.

In example embodiments, the microcontroller may be configured to perform emergency check operations. For example, in the event the microcontroller receives "expected data", the microcontroller may set a decaying emergency countdown to a user-preset number of seconds, for example, five seconds. The microcontroller may then execute an emergency countdown timer. In this operation, the microcontroller may deprecate the clock once every predetermined period, for example, one second, and reduce a countdown timer by the predetermined period of time. In the event the emergency countdown is equal to zero the microcontroller may automatically control the powered devices. For example, in the event the powered device is an LED array, the microcontroller may control the LED array to have a certain dim level, run at a certain electrical current, or execute a script. On the other hand, if the emergency countdown is greater than zero, the microcontroller may control the powered devices based on the "last user command."

In systems 2000, 3000, 4000, and 5000 the nodes 2400, 3300, 4500, and 5400 were provided power from switches 2300, 3200, 4400, and 5300 which were powered by A/C power sources having a backup. The nodes 2400, 3300, 4500, and 5400 may generally only be provided power from the switches 2300, 3200, 4400, and 5300. The inventive concepts disclosed herein, however, also extend to systems wherein the network switch providing power to attached nodes is not powered by an A/C power source having a power backup.

Figure 16:
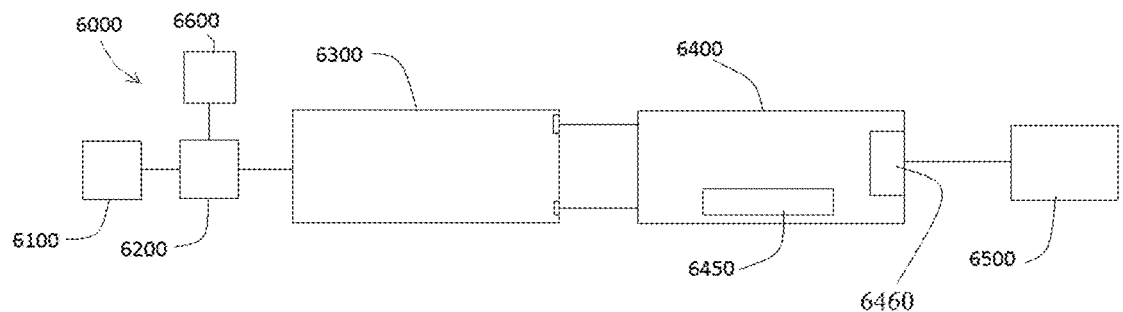
FIG. 16 is a view of a system in accordance with example embodiments.

FIG. 16 is a view of a system 6000 in accordance with example embodiments. As shown in FIG. 16, the system 6000 may be comprised of a data generator 6100 (for example, a gateway) which may be configured to generate "expected data", a PoE network switch 6200, a node 6300, and an LED array 6500 connected to the node 6300. In example embodiments the node 6300 may be connected to the PoE network switch 6200 by a conventional Ethernet cable. As such, the node 6300 may receive both power and data from the PoE network switch 6200 and may use the power and data to power and control the LED Array 6500. In the nonlimiting example of FIG. 16 the network switch 6200 may be powered by an A/C power supply 6600 which does not have a power back up.

In the embodiment of FIG. 16 the data generator 6100 may be configured to send "expected data", for example, a heartbeat signal, to the network switch 6200 which in turn forwards the "expected data" to the node 6300. In example embodiments, the data generator 6100 may be configured to send the "expected data" on a periodic basis, for example, every one second, two seconds, three seconds, or whatever is desired by the system owner. On the other hand, the "expected data" may not be sent on a periodic basis. In example embodiments, the node 6300 may be configured to control the LED array 6500 based on data received from the PoE switch 6200 (in this application, an LED array may be comprised of a single LED or a plurality of LEDs). In addition, the node 6300 may be further configured to automatically control the LED Array 6500 if it fails to receive the "expected data" for more than a predetermined time period. For example, if the node 6300 fails to receive the "expected data" for more than ten seconds (or whatever is considered suitable by the system owner), the node 6300 may control the LED array 6500 automatically. For example, the node 6300 may control the LED array 6500 to generate light at a predetermined dim level or may execute a script to control the LED array 6500. The node may also cause the LED array 6500 to be powered by a battery rather than power obtained via PoE.

In the example of FIG. 16, it is possible power to the system 6000 may be interrupted for a period of time. In example embodiments, because the network switch 6200 is connected to an A/C power supply 6600 without a backup power, the A/C power supply 6600 may cease providing power to the network switch 6200. If the network switch 6200 does not receive power from the power source 6600 the network switch 6200 may be unable to forward the "expected data" from the signal generator 6100 and may be unable to provide power to the node 6300. To compensate for the lack of power, the node 6300 may include an emergency backup circuit 6400 which may include an energy storage unit 6450.

Figure 17:
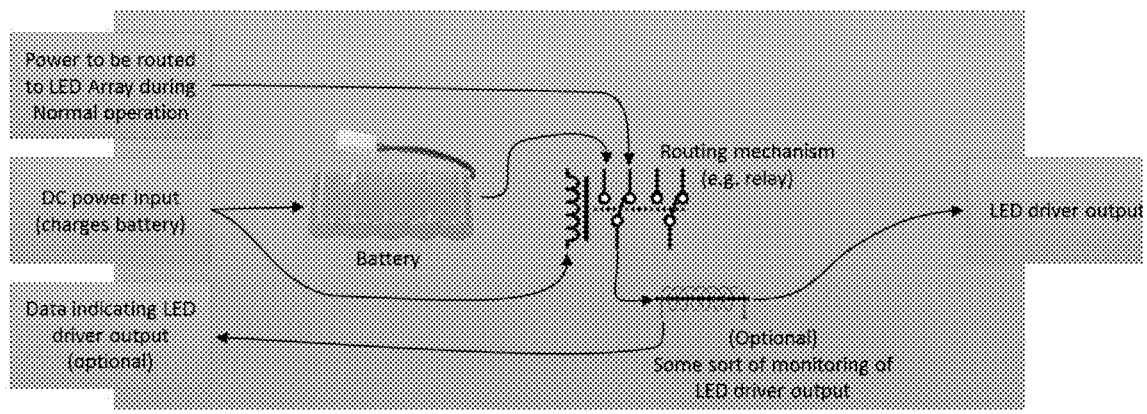
FIG. 17 is a view of a circuit in accordance with example embodiments.

FIG. 17 illustrates an example of the emergency backup circuit 6400. As shown in FIG. 17, the emergency backup circuit 6400 may include an energy storage unit 6450 which, in one nonlimiting example embodiment, may be a battery. The emergency backup circuit 6400 may include circuitry to provide some power to the energy storage unit 6450 to charge the energy storage unit 6450 when the system 6000 is not suffering a power failure. The emergency backup circuit 6400 may also include a relay 6460 to switch power to enable the emergency backup circuit 6400 to provide power to the LED array 6500 from the energy storage unit 6450 in the event the emergency backup circuit 6400 receives little to no power.

Figure 18:
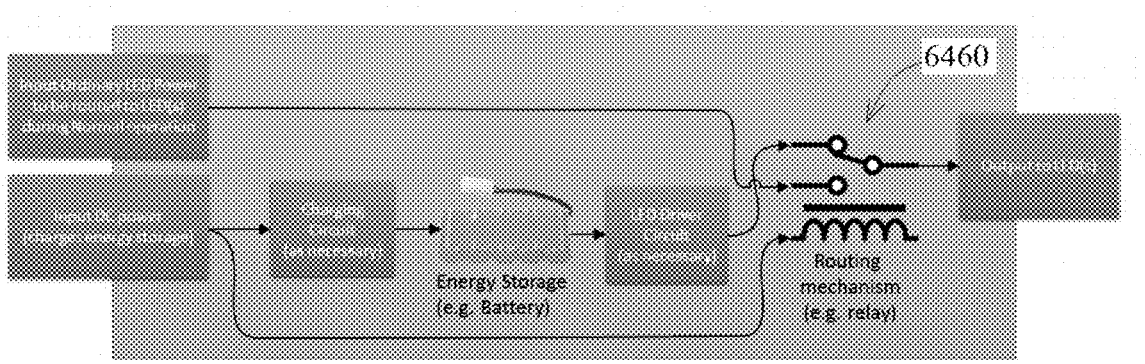
FIG. 18 is a method in accordance with example embodiments.

FIG. 18 illustrates another example of the emergency backup circuit 6400. As shown in FIG. 18, the emergency backup circuit 6400 may include an energy storage 6450 which, in one embodiment, may be a battery. The emergency backup circuit 6400 may include charging circuitry to provide some power to the energy storage unit 6450 to charge the energy storage unit 6450 when the system 6000 is not suffering a power failure. The emergency backup circuit 6400 may also include a relay 6460 to switch power to enable the emergency backup circuit 6400 to provide power to the LED array 6500 from the energy storage unit 6450 in the event the emergency backup circuit 6400 receives little to no power. In this example embodiment, so long as the input DC power receives power (from a PoE switch), then the input ordinary LED power is routed to drive the output to the LEDs. When power is lost, however, then the circuit routes power from the energy storage unit 6450 to the LED driver circuit which provides power to the LED array 6500.

Figure 19A:
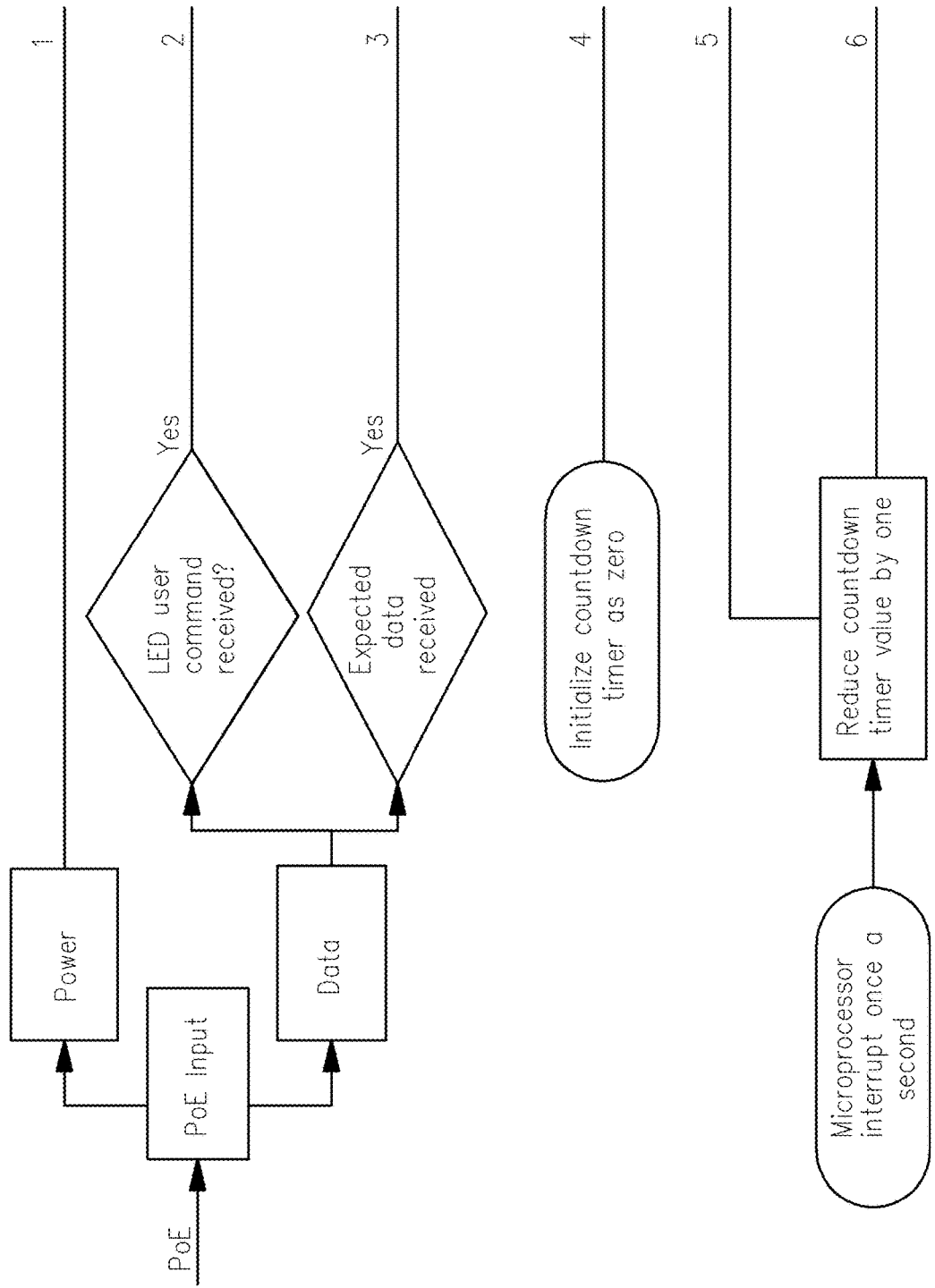
FIGS. 19A and 19B is a method in accordance with example embodiments.
Figure 19B:
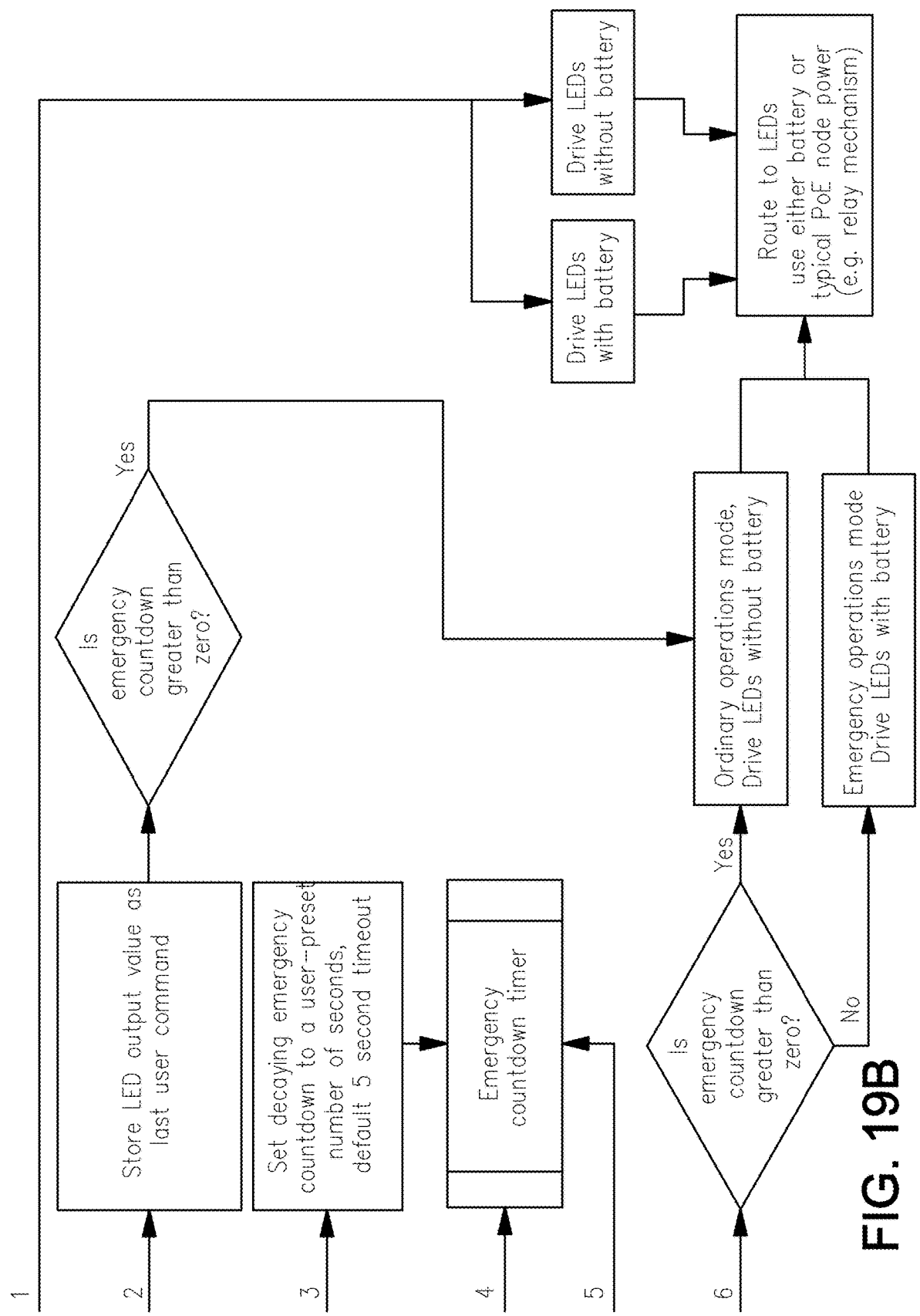

FIGS. 19A and 19B illustrate an example of a method which may be implemented by a system using node 6300 with the emergency battery circuit 6400. The method is provided for illustrative purpose only and is not intended to limit the invention.

As shown in FIGS. 19A and 19B the method may be executed by a node that receives both power and data over a conventional Ethernet cable. For example, a node having a port configured as a RJ45 connector standardized as an 8P8C modular connector or some other similar port useable to connect with a conventional Ethernet cable. In example embodiments, the node may include circuitry to extract the power and data provided at the port and provide at least a portion of the power to a driver that may control a powered device (for example, an LED driver that drives and LED array) connected to the node and another portion of the power to an energy storage unit that may be used to power the powered devices during an emergency event. The circuitry may also be configured to provide the data to a microcontroller of the node. The data may contain control commands (for example, LED user commands) and/or expected data. In the event the data includes control commands the microcontroller may store output values as a "last user command."

In example embodiments, the microcontroller may be configured to perform emergency check operations. For example, in the event the microcontroller receives "expected data", the microcontroller may set a decaying emergency countdown to a user-preset number of seconds, for example, five seconds. The microcontroller may then execute an emergency countdown timer. In this operation, the microcontroller may deprecate the clock once every predetermined period, for example, one second and reduce a countdown timer by the predetermined period of time. In the event the emergency countdown is equal to zero the microcontroller may cause the powered devices to be powered by the battery. On the other hand, if the emergency countdown is greater than zero, the microcontroller may control the powered devices based on the "last user command."

As one skilled in the art will appreciate, the method outlined in FIGS. 19A and 19B may not be executed by a processor of the node 6300 since the node 6300 may not receive power to run the processor. In this case, one skilled in the art would readily appreciate that the relay 6460, without power, would operate so that power from the energy storage unit 6450 would flow to the powered device 6500.

Example embodiments disclosed herein are not intended to limit the invention as various modifications are intended to fall within the inventive concepts. For example, the systems 2000, 3000, 4000, and 5000 may be configured so data may be pulled from an expected data source. For example, in systems 2000, 3000, 4000, and 5000 the data generators 2100, 3100, 4100, and 5100 may be configured to send data in response to an input signal. For example, in system 2000, anyone of the network switch 2200, the PoE switch 2300, or the node 2400 may send a signal to the data generator 2100 and the data generator 2100 may respond by sending data to the node 2400 via the network switch 2200 and the PoE switch 2300. Similarly, any one of the PoE switch 3200 and the node 3300 may be configured to send a signal to the data generator 3100 to cause the data generator 3100 to send data to the node 3300 via the PoE switch 3200. Similar yet, any one of the first PoE switch 4200, the intermediate device 4300, the second PoE switch 4400 and the node 4500 may be configured to send a signal to the data generator 4100 to cause the data generator 4100 to send data to the node 4500 via the first PoE switch 4200, the intermediate device 4300, and the second PoE switch 4400. Similar yet, any one of the first PoE switch 5200, the second PoE switch 5300, and the node 5400 of system 5000 may be configured to send a signal to the data generator 5100 to cause the data generator 5100 to send data to the node 5400 via the first PoE switch 5200 and the second PoE switch 5300. By these examples, it is understood the inventive concepts disclosed herein are intended to cover systems in which data may be pulled from a data source. In the event the pulling operation fails (i.e. the data generator fails to generate data in response to a signal sent to it by any of the aforementioned devices), the nodes 2400, 3300, 4500, and 5400 may control their respective devices automatically.

Figure 20:
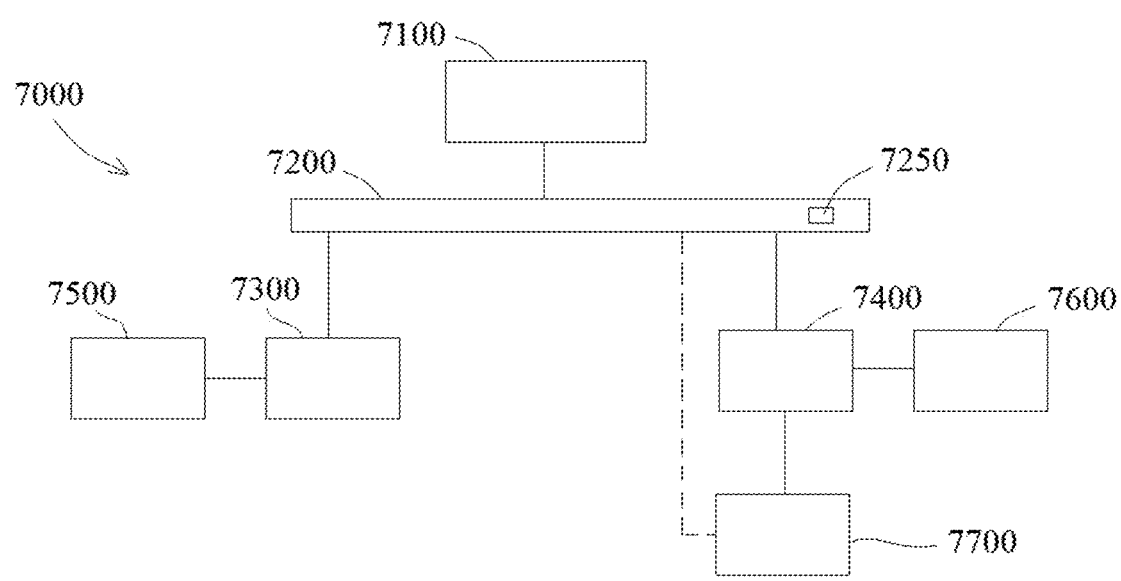
FIG. 20 is a view of a system in accordance with example embodiments.
Figure 21:
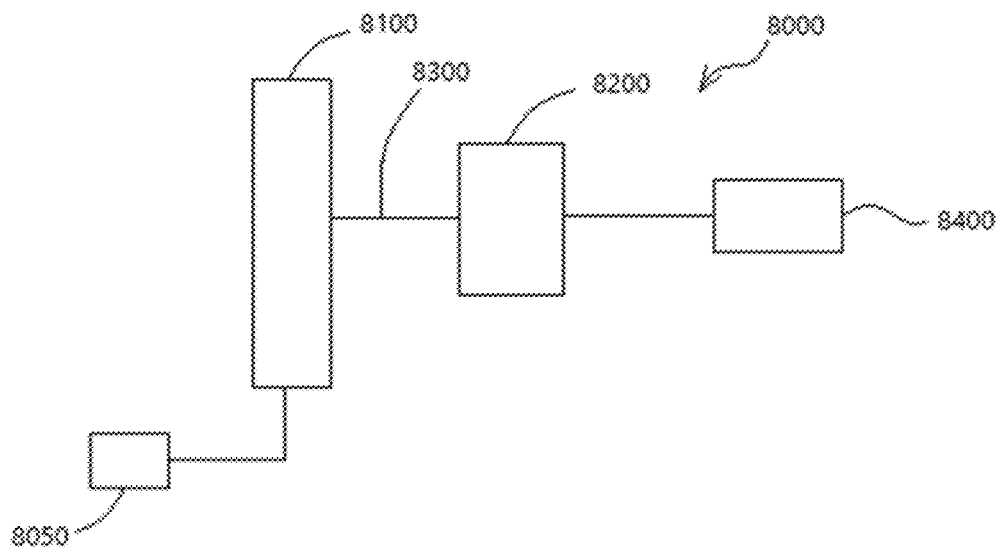
FIG. 21 is a view of a system in accordance with example embodiments.

FIG. 20 illustrates another example of a system 7000 in accordance with example embodiments. As shown in FIG. 20, the system 7000 may include a controller 7100, for example, a computer, a network switch 7200, a first node 7300, a second node 7400, a first powered device 7500, and a second powered device 7600. In this particular nonlimiting example embodiment, the network switch 7200 may be connected to the first and second nodes 7300 and 7400 via conventional Ethernet cables and may provide both power and data to the first and second nodes 7300 and 7400 via the Ethernet cables. For example, the power and data may be transmitted via PoE. Although the example of FIG. 20 includes only two nodes 7300 and 7400, the system 7000 may include more than two nodes or only a single node.

In the nonlimiting example embodiment of FIG. 20, the controller 7100 may send control signals to the network switch 7200 which may, in turn, forward the control signals to the first and/or second node 7300 and 7400. The nodes 7300 and 7400 may control their respective powered devices 7500 and 7600 based on the received control signals. Thus, in this nonlimiting example embodiment, the controller 7100 may control how the powered devices 7500 and 7600 operate.

One potential failure associated with this system 7000 is the possibility that the controller 7100 may lose power and/or go offline. To protect against this failure mode, the network switch 7200 includes a processor 7250 which may sense whether the controller 7100 has gone offline or lost power. For example, in the nonlimiting example of FIG. 7, the processor 7250 may be configured to monitor expected data, for example, a control signal or a heartbeat signal, from the controller 7100. In the event the processor 7250 does not receive the expected data, the processor 7250 may cause network switch 7200 to send control signals to the first and second nodes 7300 and 7400 to control the manner in which the first and second powered devices 7500 and 7600 operate. For example, the processor 7250 may be configured to check for expected data on a periodic basis, for example, every 0.1 seconds, 1 seconds, 5 seconds, or 10 seconds. In the event the expected data, for example, a control signal or a heartbeat signal, is not received within the periodic time limit, the network switch 7200 may be controlled by the processor 7250 to send a control signal to one or both of the nodes 7300 and 7400. The control signal may cause the nodes 7300 and/or 7400 to control their respective powered devices 7500 and 7600, for example, by executing a script that may be embedded in a memory of the nodes 7300 and/or 7400. In this manner, the controller 7100 may control the powered devices 7500 and 7600 until the controller 7100 loses power or goes offline, in which case, the network switch 7200 sends a control signal to the nodes 7300 and 7400 which thereafter control the powered devices 7500 and 7600.

In example embodiments, the system 7000 may further include a secondary controller 7700. The secondary controller 7700 may, for example, be a wall control. In this example the secondary controller 7700 may be directly connected to at least one node of system 7000 and/or also be connected to the network switch 7200. The secondary controller 7700 may, for example provide control information for the powered devices 7500 and 7600. For example, the powered devices 7500 and 7600 may, in one nonlimiting example embodiment, be lights and the nodes 7300 and 7400 may control the lights 750 and 7600 based on input from the controller 7100 or the secondary controller 7700. For example, the controller 7100 may attempt to dim the lights 7500 and 7600 at night when the lights are generally not used. A user, however, may brighten the lights by operating the wall controller 7700 which sends a signal to the nodes either directly or indirectly through the network switch 7200. As another example, in the event the controller 7100 goes offline during a time in which the lights 7500 and 7600 are normally used, the system network switch 7200 may cause the lights 7500 and 7600 to dim. However, a user operating the secondary controller 7700 may brighten the lights by using the secondary controller 7700 to send a signal to the network switch 7200 which in turn uses this information to send one or more control signals to the first and/or second nodes 7300 and 7400 to brighten the lights.

Figure 22:
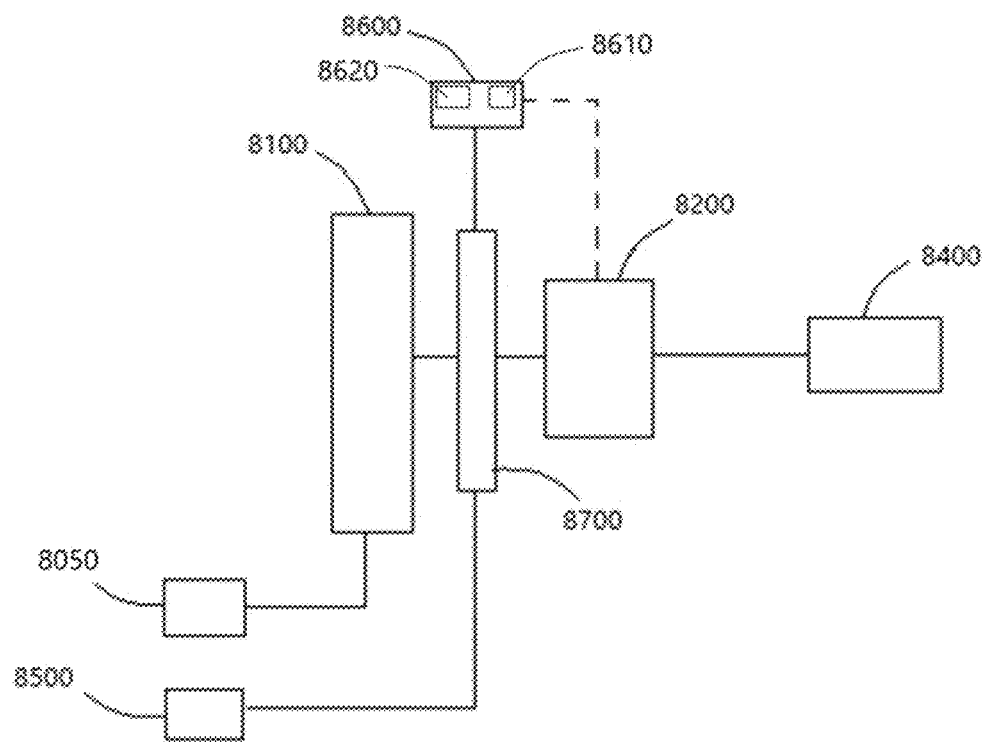
FIG. 22 is a view of a system in accordance with example embodiments.
Figure 23:
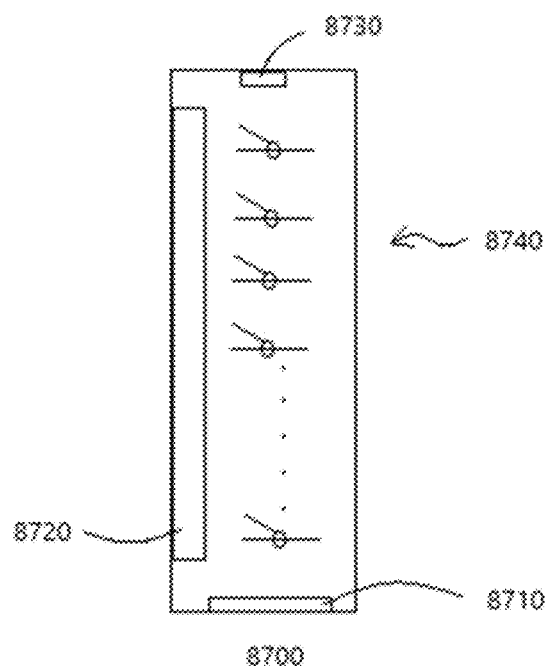
FIG. 23 is a view of a passthrough in accordance with example embodiments.

In example embodiments it is understood switch 8100 may be a conventional network switch which may have a plurality of ports to which a plurality of cables, for example, ethernet or PoE cables may attach. These cables may connect the switch 8100 to the passthrough 8700 which may include ports 8720 to receive the plurality of cables. Though not shown in the figures, it is understood the passthrough 8700 may include an additional set of ports to which a plurality of nodes may attach via a plurality of cables. Thus, while FIG. 22 shows only a single node 8200 connected to the passthrough 8700, it is understood a plurality of nodes may attach to the passthrough. Also, in example embodiments, node 8600 may receive the expected signal either by wire or wirelessly and though it is shown in the figures as receiving the signal from node 8200, it may receive a signal from another source.

Figure 24:
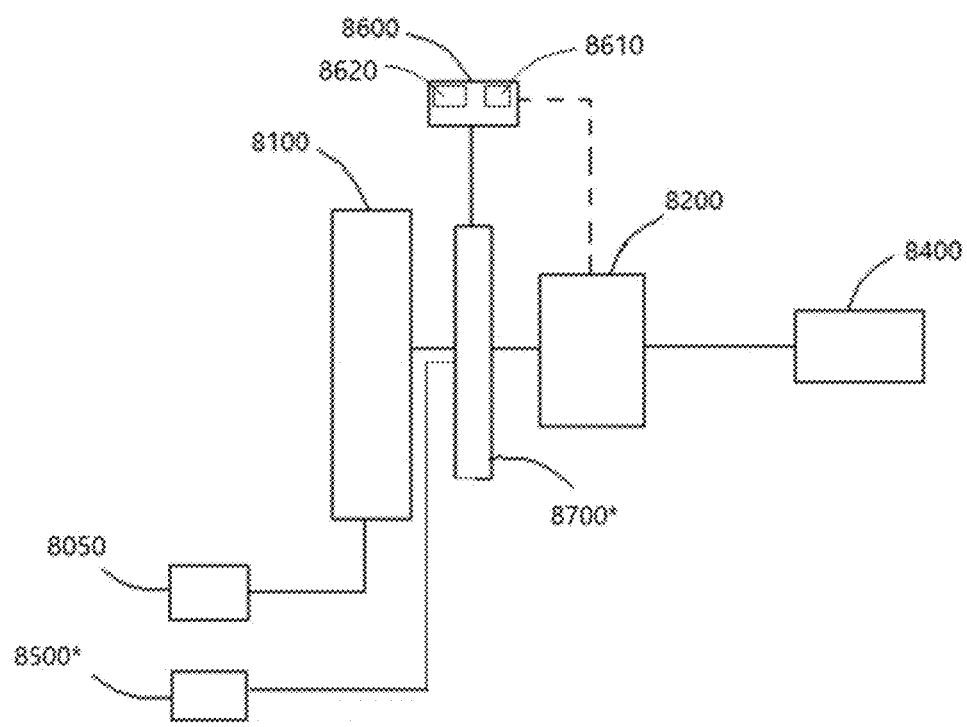
FIG. 24 is a view of a system in accordance with example embodiments.
Figure 25:
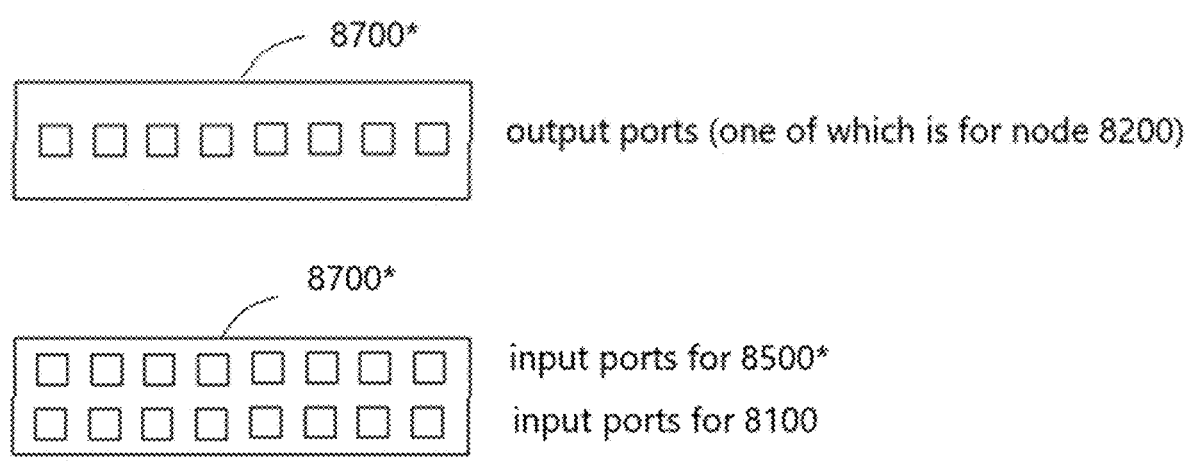
FIG. 25 is a view of a passthrough in accordance with example embodiments.
Figure 26:
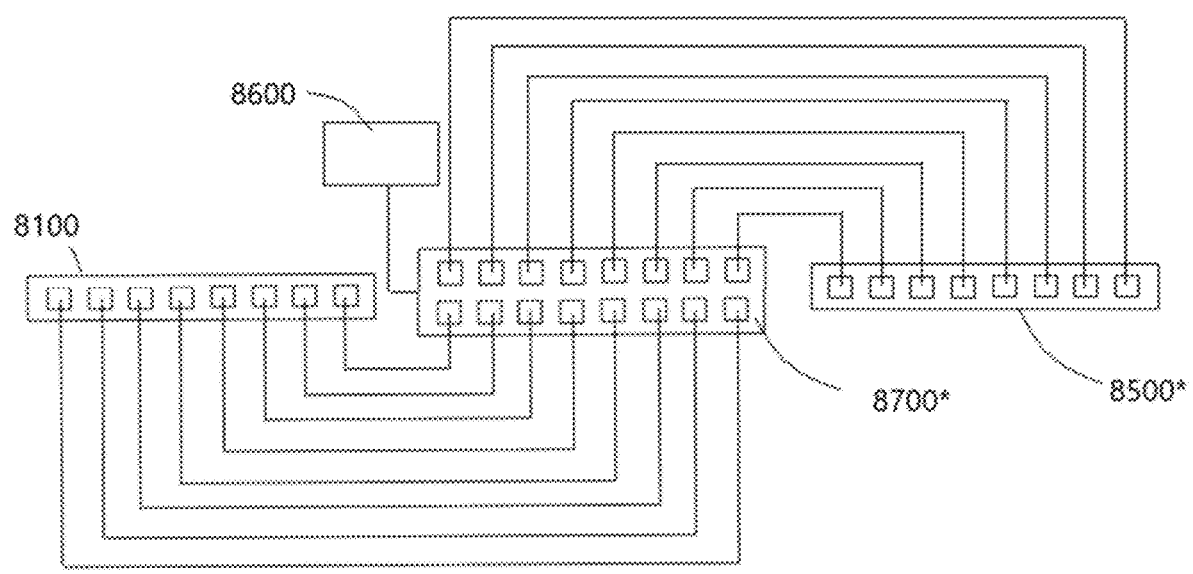
FIG. 26 is a view of a passthrough in accordance with example embodiments.
Figure 27:
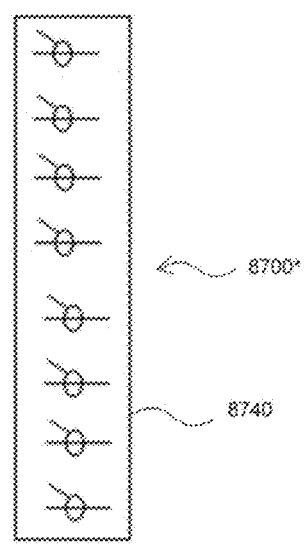
FIG. 27 is a view of a passthrough in accordance with example embodiments.

FIG. 24 is another example of a system 8000 using an inventive passthrough 8700*. The system of FIG. 24 is similar to the aforementioned system except that passthrough 8700* is configured with two inputs for one output. An example of passthrough 8700* is illustrated in FIGS. 25-26 where the passthrough 8700* includes sixteen input ports and eight output ports. The number of ports, however, is for the purpose of illustration rather than limitation since the passthrough 8700* may have more or less than sixteen input ports and more or less than 8 output ports. In the instant example, eight of the input ports connect the switch 8100 to the passthrough 8700* via cables, for example, ethernet cables. Another eight of the input ports allow a second switch 8500* to connect to the passthrough 8700*. Relays 8470 within the passthrough 8700* may determine which input port connects to an output port. Such a passthrough 8700* has certain advantages over the prior art since this would allow data and power to flow from the second switch 8500* allowing an operator to take the switch 8100 offline for repair or maintenance. For example, if switch 8100 were to go offline power to the node 8200 would be disrupted and node 8200 would no longer be capable of generating the expected signal. Node 8600 would, thereafter, respond by causing the relays 8470 to route power and data from the second switch 8500* to node 8200 enabling node 8200 to receive both power and data.

For purpose of clarity, the systems shown in FIGS. 21-27 show a single node 8200 connected to a passthrough 8700, 8700*, however, as passthrough 8700, 8700* may have multiple output ports it is understood that passthrough 8700,8700* may connect to, energize, and transfer data to multiple nodes and any one of, or all of, the nodes may be configured to send an expected signal to node 8600 allowing node 8600 to properly control its respective passthrough 8700, 8700*.

Figure 28:
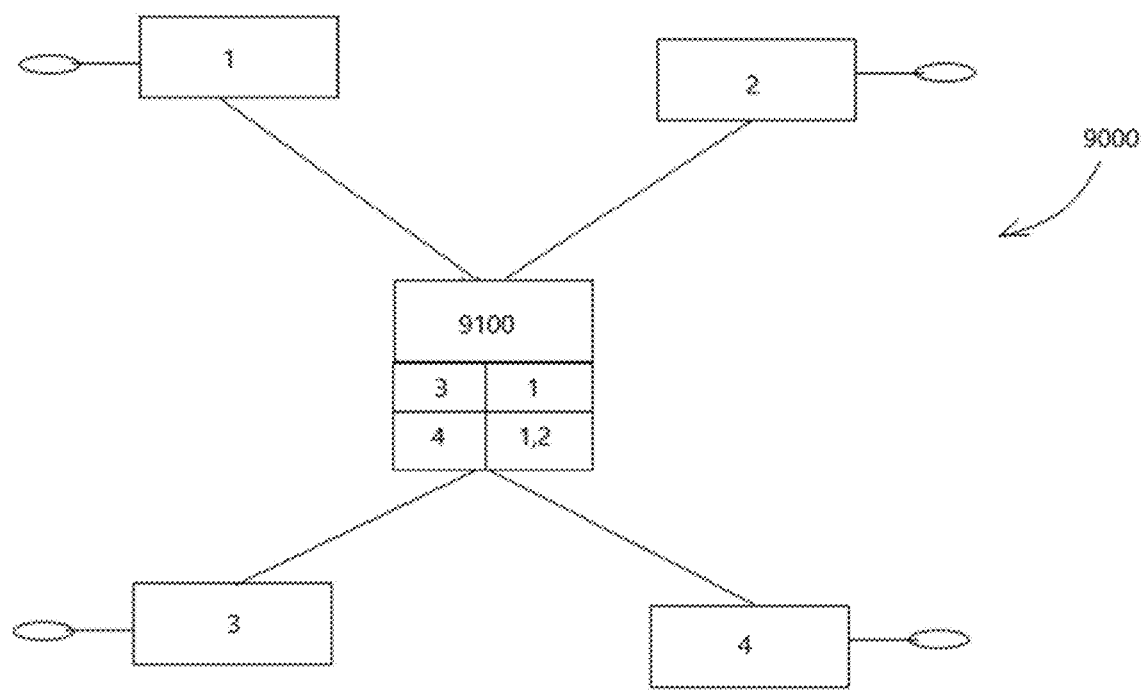
FIG. 28 is a view of a system in accordance with example embodiments.

FIG. 28 is a view of another system 9000 in accordance with example embodiments. In FIG. 28, the exemplary system 9000 includes four nodes, though the system 9000 may include more or less than four nodes. In example embodiments nodes 1 and 2 may monitor various systems, for example, mainline systems of a building and the nodes 1 and 2 may be configured to generate expected data, for example, a heartbeat signal. The system 9000 further includes a server 9100 that receives the expected data and uses a database to determine which nodes the heartbeats from nodes 1 and 2 should be sent. In this nonlimiting example embodiment, the database informs the server 9100 that heartbeats from node 1 should be forwarded to nodes 3 and 4 and that heartbeats from node 2 should be forwarded to node 4 only. In this nonlimiting example embodiment, if node 1 goes offline or fails to send a heartbeat but node 2 still sends the expected heartbeat, then the heartbeat of node 2 would be forwarded to node 4 and node 4 would function as usual. Node 3, however, would not receive a heartbeat and would cause node 3 to operate in an emergency mode. Similarly, if node 2 went off line or failed to generate expected data but node 1 operated normally (i.e. send expected data) then the expected data from node 1 would be routed to nodes 3 and 4 and nodes 3 and 4 would operate as usual. If both nodes 1 and 2 failed to generate expected data, then no data would be forwarded to nodes 3 and 4 and nodes 3 and 4 would operate in emergency mode. It is understood the system of FIG. 28 is not intended to limit the invention as the nodes 1 and 2 may have data stored in it a destination address of the nodes it is intended to send their respective heartbeats to. Therefore, the inventive aspects of this instant embodiment is not intended to limit the invention.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

The invention claimed is:

1. A system comprising:
a network switch;
a first node;
a powered device connected to the first node;
a second node configured to receive an expected signal;
an auxiliary power source; and
a passthrough between the network switch and the first node, the passthrough receiving a first power from the network switch and auxiliary power from the auxiliary power source, wherein the second node controls the passthrough to shunt power from the auxiliary power source to the first node when the expected signal is not received.

2. The system of claim 1, wherein the network switch includes a plurality of ports and the network switch is configured to distribute power to the plurality of ports.

3. The system of claim 1, wherein the passthrough comprises a plurality of relays controlled by the second node.

4. The system of claim 1, wherein the passthrough includes at least one cable directly connecting the network switch to the passthrough, at least one cable directly connecting the auxiliary power source to the passthrough, and at least one cable directly connecting the passthrough to the first node.

5. The system of claim 4, wherein the auxiliary power source is a second network switch providing the auxiliary power and data to the passthrough.

6. The system of claim 1, wherein the expected signal is expected to come from the first node.

7. The system of claim 1, wherein the second node is configured to shunt data via the passthrough to the first node when the expected signal is not received.

8. The system of claim 1, wherein the expected signal is a heartbeat signal.

9. The system of claim 1, wherein the passthrough includes a plurality of relays controlled by the second node, at least one cable directly connecting the network switch to the passthrough, at least one cable directly connecting the auxiliary power source to the passthrough, and at least one cable directly connecting the passthrough to the first node.

10. The system of claim 9, wherein the auxiliary power source is a second network switch.

11. The system of claim 10, wherein the passthrough shunts data from the second network switch to the first node.

* * * * *